US009616636B2

(12) United States Patent
Gafni

(10) Patent No.: US 9,616,636 B2
(45) Date of Patent: Apr. 11, 2017

(54) CARDBOARD-BASED UNIT

(71) Applicant: I.G. CARDBOARD TECHNOLOGIES LTD., Tel Aviv (IL)

(72) Inventor: Izhar Gafni, Ahituv (IL)

(73) Assignee: I.G. CARDBOARD TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 15/008,293

(22) Filed: Jan. 27, 2016

(65) Prior Publication Data

US 2016/0137255 A1    May 19, 2016

Related U.S. Application Data

(60) Division of application No. 14/533,841, filed on Nov. 5, 2014, which is a continuation-in-part of application No. PCT/IL2013/050823, filed on Oct. 13, 2013.

(Continued)

(51) Int. Cl.
*B62K 19/02* (2006.01)
*B32B 3/12* (2006.01)

(Continued)

(52) U.S. Cl.
CPC .......... *B32B 3/12* (2013.01); *B32B 1/00* (2013.01); *B32B 3/00* (2013.01); *B32B 3/02* (2013.01); *B32B 3/04* (2013.01); *B32B 3/06* (2013.01); *B32B 3/26* (2013.01); *B32B 3/266* (2013.01); *B32B 3/28* (2013.01); *B32B 7/02* (2013.01); *B32B 29/00* (2013.01); *B32B 29/005* (2013.01); *B32B 29/06* (2013.01); *B32B 29/08* (2013.01); *B62K 3/02* (2013.01); *B62K 19/02* (2013.01); *B62K 19/14* (2013.01); *B62K 19/16* (2013.01); *B62K 21/00* (2013.01); *B32B 2250/00* (2013.01); *B32B 2250/26* (2013.01);

(Continued)

(58) Field of Classification Search
CPC .. B62K 3/02; B62K 19/02; B32B 3/04; B32B 29/00; B32B 29/005
USPC ...................................... 280/281.1
See application file for complete search history.

(56) References Cited

U.S. PATENT DOCUMENTS

| 1,986,234 | A |   | 1/1935 | Weiner |   |
|---|---|---|---|---|---|
| 2,284,333 | A | * | 5/1942 | McGirl | ............ B62K 3/00 280/261 |

(Continued)

FOREIGN PATENT DOCUMENTS

| CN | 2541301 Y | 3/2003 |
|---|---|---|
| CN | 1654033 A | 8/2005 |

(Continued)

OTHER PUBLICATIONS

Viva Sarah Press; "Nimrod Elmish Interview—Cardboard wheelchair to roll out from Israel"; ISRAEL 21c; Published: Oct. 28, 2012 (http://www.israel21c.org/cardboard-wheelchair-to-roll-out-from-israel/).

(Continued)

*Primary Examiner* — Joseph Rocca
*Assistant Examiner* — Michael Stabley
(74) *Attorney, Agent, or Firm* — Kenealy Vaidya LLP

(57) ABSTRACT

The present disclosure provides a cardboard-based unit, structural elements comprising said unit and land-vehicles comprising said units and structural elements.

10 Claims, 20 Drawing Sheets

Related U.S. Application Data

(60) Provisional application No. 61/818,611, filed on May 2, 2013.

(51) Int. Cl.

| | | |
|---|---|---|
| *B32B 29/00* | (2006.01) | |
| *B62K 3/02* | (2006.01) | |
| *B32B 29/06* | (2006.01) | |
| *B32B 29/08* | (2006.01) | |
| *B32B 1/00* | (2006.01) | |
| *B32B 3/00* | (2006.01) | |
| *B32B 3/02* | (2006.01) | |
| *B32B 3/04* | (2006.01) | |
| *B32B 3/06* | (2006.01) | |
| *B32B 3/26* | (2006.01) | |
| *B32B 3/28* | (2006.01) | |
| *B32B 7/02* | (2006.01) | |
| *B62K 21/00* | (2006.01) | |
| *B62K 19/14* | (2006.01) | |
| *B62K 19/16* | (2006.01) | |

(52) U.S. Cl.
CPC ..... *B32B 2307/50* (2013.01); *B32B 2307/544* (2013.01); *B32B 2307/72* (2013.01); *B32B 2307/732* (2013.01); *B32B 2307/734* (2013.01); *B32B 2439/00* (2013.01); *B32B 2605/00* (2013.01)

(56) References Cited

U.S. PATENT DOCUMENTS

| | | | |
|---|---|---|---|
| 2,393,776 A * | 1/1946 | Horr | F41J 1/08 |
| | | | 273/348 |
| 2,997,266 A | 8/1961 | Munroe | |
| 3,492,016 A * | 1/1970 | O'Connor | B60B 37/10 |
| | | | 16/45 |
| 3,605,585 A | 9/1971 | Borders | |
| 3,708,101 A | 1/1973 | McDanield | |
| 3,734,389 A | 5/1973 | Brown | |
| 4,003,155 A | 1/1977 | Raskin | |
| 4,247,289 A | 1/1981 | McCabe | |
| 4,303,020 A | 12/1981 | Houle | |
| 4,399,915 A | 8/1983 | Sorenson | |
| 4,657,795 A | 4/1987 | Foret | |
| 4,771,893 A | 9/1988 | Liebel | |
| 4,790,546 A | 12/1988 | Mendenhall | |
| 5,000,717 A | 3/1991 | Pfeiffer | |
| 5,022,666 A | 6/1991 | Simon | |
| 5,040,684 A | 8/1991 | Knowles | |
| 5,151,078 A | 9/1992 | Lin | |
| 5,240,267 A * | 8/1993 | Owsen | B62K 5/10 |
| | | | 280/124.103 |
| 5,318,742 A * | 6/1994 | You | B29C 53/566 |
| | | | 156/156 |
| 5,397,146 A * | 3/1995 | Fischer | B62J 23/00 |
| | | | 280/288.4 |
| 5,540,485 A * | 7/1996 | Enders | B60B 5/02 |
| | | | 301/104 |
| 5,996,510 A | 12/1999 | Harpman | |
| 6,109,638 A * | 8/2000 | Colegrove | B62K 3/10 |
| | | | 280/281.1 |
| 6,347,772 B1 | 2/2002 | L Hotel | |
| 6,378,764 B1 | 4/2002 | Teixidor Casanovas | |
| 6,585,268 B2 | 7/2003 | Williams | |
| 6,817,621 B2 * | 11/2004 | Varan | B62M 1/36 |
| | | | 280/261 |
| 7,014,046 B2 | 3/2006 | Niu et al. | |
| 7,137,517 B2 | 11/2006 | Lowry | |
| D537,758 S * | 3/2007 | Grepper | B62M 1/36 |
| | | | D12/111 |
| 7,299,924 B2 | 11/2007 | Robinson, Jr. | |
| D561,649 S * | 2/2008 | Latham | B62M 1/36 |
| | | | D12/111 |
| D567,149 S * | 4/2008 | Grepper | B62M 1/36 |
| | | | D12/111 |
| 7,383,952 B2 | 6/2008 | Kruelle | |
| 8,191,931 B1 * | 6/2012 | Mulder | B62K 9/00 |
| | | | 280/828 |
| 8,205,366 B2 | 6/2012 | Condor | |
| 8,286,974 B2 * | 10/2012 | Chen | B62K 9/00 |
| | | | 280/1.188 |
| D671,173 S * | 11/2012 | Tompkin | B62M 1/36 |
| | | | D12/111 |
| 8,925,949 B2 | 1/2015 | Zecchetto | |
| 2003/0111383 A1 | 6/2003 | Qiu et al. | |
| 2003/0197346 A1 * | 10/2003 | Singenberger | B62K 19/34 |
| | | | 280/281.1 |
| 2004/0119330 A1 * | 6/2004 | Chuang | B60B 1/041 |
| | | | 301/110.5 |
| 2005/0008817 A1 | 1/2005 | Rodriguez et al. | |
| 2006/0207481 A1 * | 9/2006 | McCarthy | B65D 19/0026 |
| | | | 108/51.3 |
| 2007/0262558 A1 | 11/2007 | Segato | |
| 2008/0035819 A1 | 2/2008 | Garfin | |
| 2009/0123770 A1 | 5/2009 | Melville | |
| 2010/0078985 A1 | 4/2010 | Mahoney | |
| 2010/0148460 A1 * | 6/2010 | Nelson | B62K 13/00 |
| | | | 280/87.021 |
| 2011/0133427 A1 | 6/2011 | Bashan | |
| 2012/0187650 A1 * | 7/2012 | Chen | B62K 9/00 |
| | | | 280/263 |
| 2013/0277934 A1 * | 10/2013 | De Roeck | B62K 9/02 |
| | | | 280/87.021 |

FOREIGN PATENT DOCUMENTS

| | | |
|---|---|---|
| CN | 1950247 A | 4/2007 |
| CN | 201080232 Y | 7/2008 |
| CN | 103144828 A | 6/2013 |
| CN | 203739534 U | 7/2014 |
| DE | 202013000837 U1 | 2/2013 |
| ES | 1074812 U | 6/2011 |
| GB | 2080767 A | 2/1982 |
| JP | S1316852 | 11/1938 |
| JP | S60-195769 U | 12/1985 |
| JP | H05170264 A | 7/1993 |
| JP | H8-91046 A | 4/1996 |
| JP | H8-133340 A | 5/1996 |
| JP | H11-240533 A | 9/1997 |
| JP | H10119965 A | 5/1998 |
| JP | 3058543 U | 6/1999 |
| JP | H11210130 A | 8/1999 |
| JP | 2000129599 A | 5/2000 |
| JP | 3102634 U | 10/2000 |
| JP | 2001030377 A | 2/2001 |
| JP | 2005512900 A | 5/2005 |
| JP | 3696756 B2 | 9/2005 |
| JP | 2009061603 A | 3/2009 |
| JP | 3172033 U | 12/2011 |
| JP | 2013527066 A | 6/2013 |
| WO | 2011/067742 A1 | 6/2011 |
| WO | 2014/061012 A1 | 4/2014 |
| WO | 2014/141228 A1 | 9/2014 |

OTHER PUBLICATIONS (Video, two Internet addresses are provided) Design Hobby: "Ridable Cardboard Bicycle" (Izhar Gafni), 2012 (accessible at 'http://www.shejipi.com/9665.html', or 'http://v.youku.com/v_show/id_XNDM2MzE0Mzlw.html'.

* cited by examiner

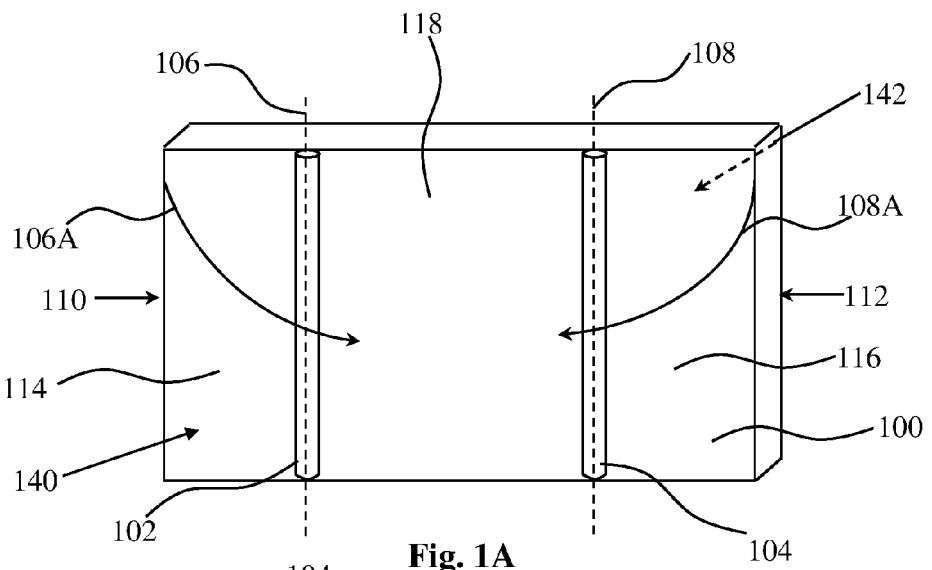
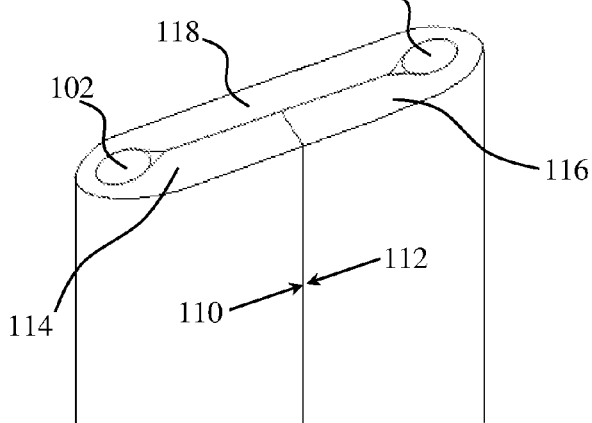
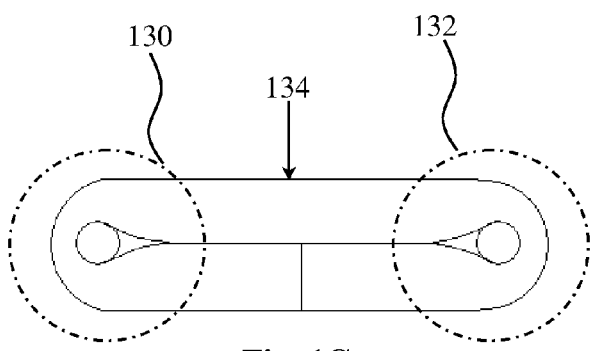

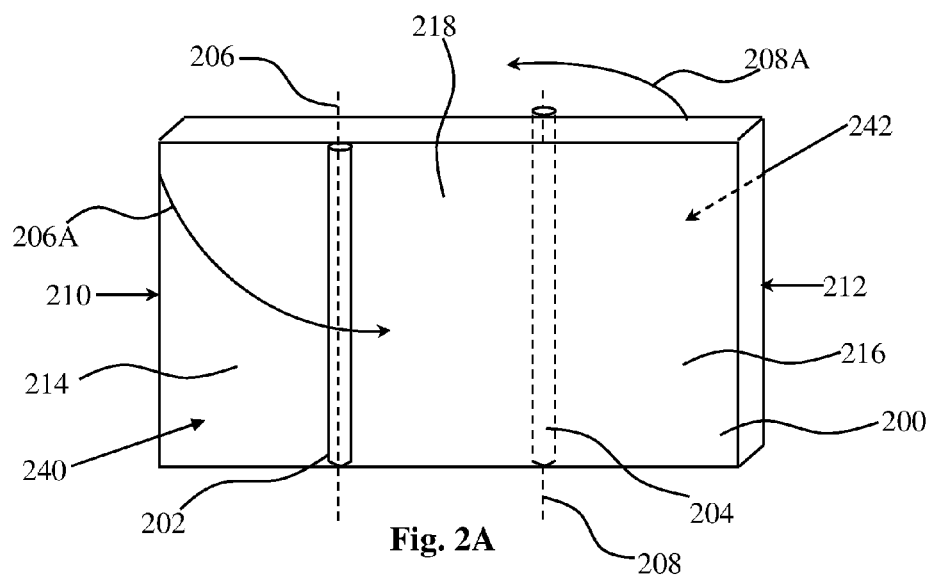
Fig. 2A
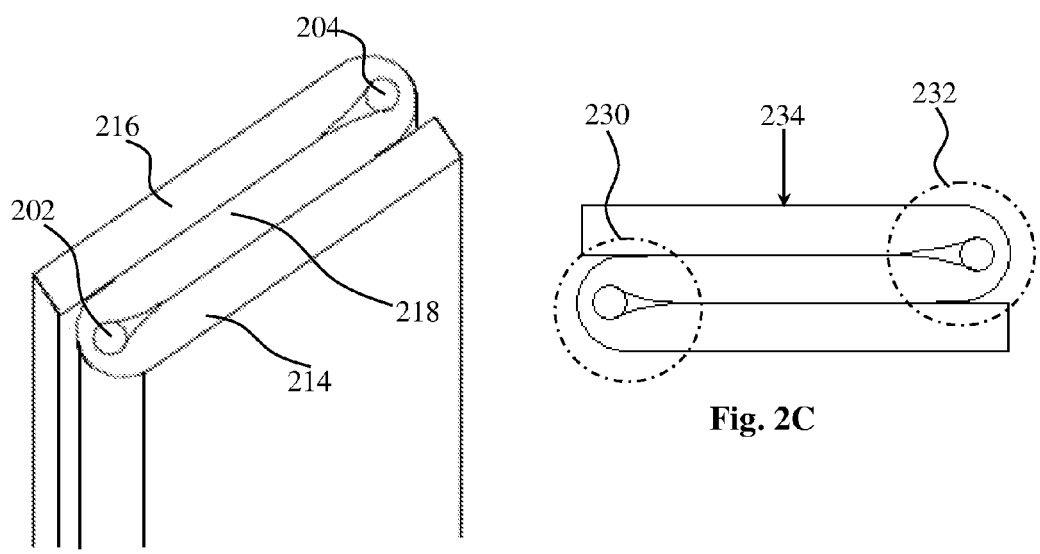
Fig. 2B
Fig. 2C

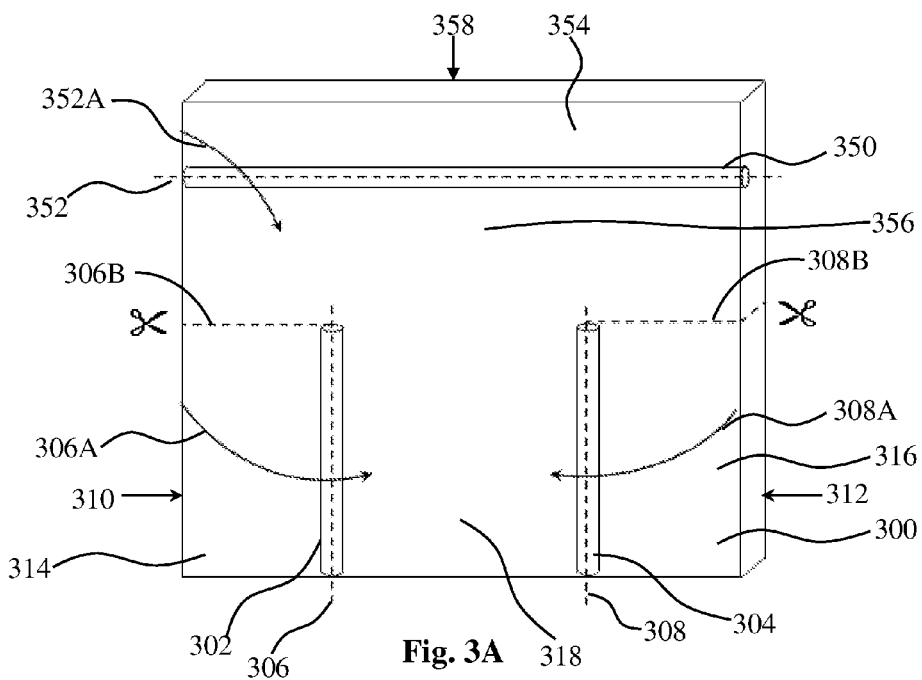
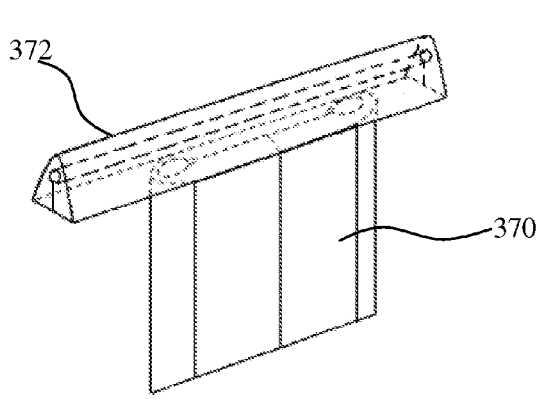
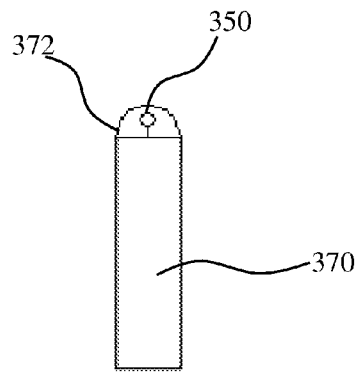
Fig. 3A
Fig. 3B
Fig. 3C

CARDBOARD-BASED UNIT

CROSS REFERENCE TO RELATED APPLICATION

This application is a divisional of U.S. patent application Ser. No. 14/533,841 filed on Nov. 5, 2014, which is a continuation-in-part of PCT Patent Application No. PCT/IL2013/050823, filed on Oct. 13, 2013, which claims the priority benefit under 35 U.S.C. §119 of U.S. Provisional Application No. 61/818,611 filed May 2, 2013, the contents of which are hereby incorporated in their entireties by reference.

TECHNOLOGICAL FIELD AND BACKGROUND

The present disclosure relates to units substantially or entirely made of cardboard that may be used as structural elements in structures and devices such as wheeled devices (e.g. bicycle or tricycle).

WO11067742 discloses a human-powered land vehicle sufficiently rigid so as to transport a human rider. The vehicle is constructed from pulpably recyclable and shreddably recyclable materials.

GENERAL DESCRIPTION

The present disclosure provides, by a first of its aspects, a structural unit made from or comprising cardboard as its major component. This means that cardboard constitutes typically at least about 60%, 65%, 70%, 75%, 80%, 85%, 90%, and at times even at least 95% of the total weight of the structure. The unit comprises, as will be illustrated below, low density cardboard layers.

By a first aspect, the unit of this disclosure comprises reinforcing, elongated members that may be made of cardboard, e.g. may be cardboard cylinders or rods; or may be made of other light materials, such as wood or plastic. The elongated members are then wholly or partially enveloped by portions of the low density cardboard panel formed to be in tight association with said elongated members. Some other portions of the cardboard panel are associated with one another to define a multi-layer cardboard element.

By a second aspect, the multi-layer cardboard unit comprises a high density cardboard layer. For example, two low density cardboard layers may sandwich a high density cardboard layer. A particular example is a 3-layer structure with two external layers of low density cardboard sandwiching a high density cardboard layer.

A unit of this disclosure may also combine features of both aspects, namely comprising one or more such elongated members as well as a high density cardboard layer sandwiched between two low density cardboard layers.

Said elongated members with the associated portions of the cardboard panel jointly form a core-envelope element. The core-envelope element may be situated at and define edges of a multi-layer planar unit. The core-envelope element has usually also a functional significance in reinforcing the structural rigidity in bend, compression and tension resistance disclosure, as will also be explained further below. The structure of the disclosure may constitute a part of a device, such as a wheeled device, e.g. parts of a bicycle or tricycle.

The disclosure, thus provides, by the first aspect, a substantially planar, cardboard-based unit comprising (i) two or more layers of cardboard that are closely associated, typically adhered, with one another and that may be constituted by a formed low-density cardboard panel, and comprising (ii) two or more integral core-envelope elements, each comprising enveloping portions of the low density cardboard that are tightly associated with corresponding two or more elongated members. For example, the unit may be constituted from a formed cardboard panel that is wrapped about the elongated members, with portions of the panel facing one another are tightly associated with one another, e.g. by an adhesive.

Provided, by the second aspect of this disclosure, is a unit comprising a high density cardboard panel sandwiched between two layers of low-density cardboard.

The combination of one or more layers of a high density cardboard, particularly when tightly sandwiched between two layers of low-density cardboard as provided by the second aspect, provides for additional reinforcement, especially against compression or deformation in a direction normal to the plane of the cardboard layers, as compared to such a unit that has a similar layers' structure but devoid of the high density cardboard layer.

It should be noted that the structural unit may also comprise an external varnish or other coating layer. The reference made herein to a multi-layer structure excludes such layers and focuses on the structural elements of the unit. Thus, for example, a unit with a 3-layer cardboard structure may also comprise additional coating layers.

Generally, the term "elongated" means that the element has a length dimension that is significantly more prominent than other measurements of the element. Such an element may generally have the structure similar to that of the elongated element disclosed in co-owned PCT application having the publication number WO2014/061012 (hereinafter: "the '012 PCT application"). One or both of the panel portions embracing the elongated member (referred to therein as the "rectangular sub-structure") is integral with panel portion that forms other parts of the structure.

The term "cardboard panel" means a planar or substantially planar cardboard piece with a broad surface that is substantially thin as compared to its length and width. The cardboard panel may be a uniform cardboard piece but may also, for example, be made of two or more planar cardboard pieces glued or otherwise adhered together to form a larger cardboard panel that is formed into the unit's different elements.

The term "formed" (or any of its linguistic variations) means to denote the act of giving form or shape to the cardboard panel, namely forming the panel into a final intended shape in the unit. Such forming comprises, for example, wrapping a portion of the panel over the elongated member to thereby obtain the core-envelope structure of the so-formed elongated element. Such forming may also comprise, in some embodiments, defining voids in said planar element.

The term "integral" means that the panel portions that are used in the formation of the different elements are all portions of a single, formed panel. Thus, for example, in the case of a panel portion that is enveloping the elongated member, defining two skirts of the panel extending from an apex defined along the elongated member, at least one or both of the skirt portions of the panel extends into other portions of the panel that define one or more other elements of the unit.

As noted, portions of the panel according to said first aspect are wrapped about two or more elongated members such that the panel comes into tight association with said members to thereby define said elongated, core-envelope elements. The elongated core-envelope element, formed through the association between the elongated member and the enveloping cardboard panel, may impart an increased rigidity, e.g. bend, tension and compression resistance to the cardboard structure, as compared to rigidity and said resistance of a similar cardboard structure that does not include such elongated core-envelope elements. Said elongated core-envelope element may define an edge of a planar multi-layer (e.g. bi-layer) cardboard unit. Typically, two such elongated core-envelope elements define edges of a substantially planar element that extends therebetween.

The elongated members (which, as noted above, may be made of cardboard, wood or plastic) typically have a rounded shape, e.g. circular cross-section (although at times it may be oval, elliptical, etc.); and accordingly said elongated core-envelope elements are typically rounded, although they may be shaped by the use of appropriate dies into other shapes, e.g. to have a substantially rectangular external cross-sectional shape.

The disclosure embodies some features, common with those of the '012 PCT application as well as of another PCT application Serial No. PCT/IL2013/050823, the relevant contents of both incorporated herein by reference.

The cardboard-based unit of the first aspect of this disclosure has a 3- or 4-point bending strength normal to said elongated core-envelope elements that is significantly larger than that of a cardboard structure devoid of such elongated core-envelope elements. The term "significantly larger" means that it is at least two, five and, at times, at least 10-fold larger than that of either the reinforcing members or the regular bi-layer cardboard structure, one without the elongated members. Some explanations and parameters concerning this bend resistance can be found in the '012 PCT application, the contents of which, as noted above, is incorporated herein by reference for the relevant portions thereof.

The "low density cardboard panel" denotes a cardboard panel comprising (i) at least one low-density layer made of paper, high density paper or cardboard (for ease of reference the term "paper", will be used hereinafter to refer collectively to paper, high density paper or cardboard) arranged to define a plurality of cells or voids, e.g., formed by corrugated, fluted or otherwise loosely packed paper sheets or strips that define a plurality of voids therebetween, and comprising (ii) one or more liner cardboard sheets lined at one side or both sides of the low-density layers (namely sandwiching the low-density layer between them). Examples of such cardboard panels are such known as "corrugated cardboard", which consists of a fluted or corrugated paper panel(s) or strip and one or two flat linerboards at one or both (i.e. sandwiching) sides of the fluted or corrugated paper; and may also be such referred to as "honeycomb cardboard". Such materials are widely used in the manufacture of boxes and shipping containers. The corrugated or honeycomb cardboard panels may be single-walled or multi-walled cardboard panel.

The term "high density cardboard" denotes a cardboard panel that is substantially uniform throughout its cross-section. A high density cardboard does not have a low-density layer of the kind described above.

By one embodiment of the first aspect, the cardboard-based unit comprises two first elongated core-envelope elements that are parallel to one to the other, being formed with corresponding parallel elongated members. Such first elongated core-envelope elements define edges of a planar element that extends therebetween. The first elongated core-envelope elements are associated to corresponding first parallel elongated members. Said first elongated members may separate each between a central segment of the original cardboard panel and one of first or second flanking segments that flank the central segment; the flanking segments and the central segment, once a portion of the panel is wrapped over the elongated members, jointly form a two-layer element.

According to one embodiment, one or more portions of a first face of the first flanking segment are attached to one or more portions (opposite in the formed structure) of the first face of the central segment. By another embodiment, one or more portions of the first face of the first flanking segment and one or more portions of the first face of the second flanking segment are both attached to corresponding portions of the first face of the central segment. According to this embodiment at least two parallel elongated members are associated with the first face of the panel. The structure is typically formed such that opposite edges of the original panel, being the edges at the end of the flanking segments, are brought into proximity with one another. In this manner a closed loop structure (as can best be seen in a cross-section) is formed by the panel, with the first elongated core-envelope elements defining the extreme ends of such a loop.

By another embodiment, rather than forming a closed loop structure, a cardboard panel is folded into a form generally resembling an "S" shape with oppositely oriented folds. In such a configuration, one or more portions of a first face of the first flanking segment is attached to corresponding one or more portions of the first face of the central segment; while one or more portions of the second face of the central segment is attached to corresponding one or more portions of the second face of the second flanking segment. In this configuration, the elongated members within the first parallel elongated core-envelope elements are associated one with the first face and the other with the second face of the panel.

By one embodiment such a planar cardboard unit is substantially uniform with a complete cardboard multi-layer structure over the entire surface. In another embodiment, one or more voids are formed in this planar cardboard element, which may have decorative or functional significance, e.g. through cut-outs from the multi-layer cardboard element or through appropriately forming of the original cardboard panel.

In accordance with one embodiment, the cardboard-based unit comprises one or more integral second elongated, core-envelope elements (formed by a portion of the cardboard panel that is wrapped about an elongated member oriented normal to said first elongated core-envelope elements.

In accordance with some embodiments, the cardboard-based unit of this disclosure (of both the first and the second aspects) constitutes part of a wheeled device or a land vehicle, such as a bicycle or tricycle.

Provided by a third aspect this disclosure is a vehicle, such as a tricycle or bicycle comprising a structural unit of the kind described herein. A particular example is a bicycle of the kind known as a "balance bike" or "run bike", which is a training bicycle, intended primarily for children, having no pedals or drive chain, and where the rider (typically the child) propels itself by pushing the ground with his/her feet. In such a bicycle or tricycle the body may be a structural unit with the characteristics of that of this disclosure. Also, or alternatively, the front wheel steering frame may also be a structural unit with the characteristics of that of this disclosure.

By one embodiment the fork assembly has a fork with the characteristics of a structural unit according to the first aspect, with or without an additional high density cardboard panel sandwiched between the two low density cardboard panels; and the body has the characteristics of a structural unit according to the second aspect.

Provided by an embodiment of the invention is a bicycle that comprises (i) a body that extends between a front end and a rear end of the bicycle with a rear wheel that is fitted at the rear end of the body, namely at the end itself or close to it, and (ii) a fork assembly that is pivotally coupled to the body and having a front wheel that is rotationally fitted to said fork. The body and the fork assembly comprise each an element that has the characteristics of the units disclosed herein. The body and the fork assembly are typically constituted entirely out of cardboard and have the characteristics of said units.

By one embodiment the body comprises a planar body element embodying the characteristics of the unit of the second aspect of this disclosure and the fork assembly comprising an element embodying the characteristics of the unit of the first aspect of this disclosure.

An exemplary bicycle, e.g. a training bike, has the following characteristics:

(i) a body that comprises two planar body elements, each defining a vertical plane and are, typically, mirror images of one another and having both a front end and a rear end, the two body elements being attached to one another at their front end portion to define a front body block and diverge from one another towards the rear end to thereby define a body space between them; each of said elements embodying the characteristics of the unit of said second aspect;

(ii) a rear wheel fitted within the body space and being rotationally coupled to the two panels at a rear end thereof by a horizontal axle that is received within co-axial bushings (typically, but not exclusively, made of plastic) fitted in said panels;

(iii) a steering assembly comprising a planar fork member embodying the characteristics of the unit of the first aspects and formed by cut-outs to define (1) a fork portion with two stems defining between them a stem space, and (2) a panel opening in a mid-portion of the panel;

(iv) a vertical pivot-accommodating receptacle formed within said front body block and accommodating a pivot that extends vertically through the panel opening between bushings (typically, but not exclusively, made of plastic) formed at opposite edges of said opening to hinge said fork to said body; and (v) a front wheel fitted within the stem space and being rotationally coupled to the two stems by a horizontal axle that is received within co-axial bushings fitted in said stems.

EMBODIMENTS

Some exemplary embodiments are defined in the numbered paragraphs below. The description of these embodiments is not intended to derogate but rather to add onto the general description above and the detailed description that follows.

1. A unit, comprising
one or more substantially planar elements comprising two or more layers of low density cardboard that are closely associated with one another, particularly such that are constituted from a formed low density cardboard panel; and two or more integral core-envelope elements that comprises enveloping portions of the low density cardboard that are tightly associated with corresponding two or more elongated members.

2. The unit of embodiment 1, wherein the cardboard layers in said planar elements are attached to one another at portions thereof.
3. The unit of embodiment 1 or 2, wherein said elongated members have a rounded cross-section. 4. The unit of embodiment 3, wherein said elongated members have a circular cross-section.
5. The unit of any one of embodiments 1-4, wherein said elongated members are made of wood, cardboard or plastic.
6. The unit of any one of embodiments 1-5, wherein said cardboard panel comprises (i) at least one low-density layer and (ii) one or more liner cardboard sheets lining at least one side of the at least one low-density layer.
7. The unit of embodiment 6, wherein the low-density cardboard is corrugated cardboard or honeycomb cardboard.
8. The unit of any one of the embodiments 1-7, wherein said elongated core-envelope elements impart an increased rigidity and bend resistance to the cardboard unit.
9. The unit of any one of the embodiments 1-8, wherein said elongated core-envelope elements define edges thereof.
10. The unit of embodiment 9, wherein said edges have a rounded external cross-sectional shape.
11. The unit of any one of embodiments 1-10, wherein two of said elongated core-envelope elements are parallel one to the other.
12. The unit of embodiment 11, wherein the two parallel elongated core-envelope elements define edges of a substantially planar structural element that extends therebetween.
13. The unit of any one of embodiments 1-12, wherein two flanking segments of a panel are folded over the elongated members and are associated with a central segment of the panel that is defined between said elongated members.
14. The unit of embodiment 13, wherein one or more portions of one face of said first flanking segment are attached to one or more portions of the same face of said central segment.
15. The unit of embodiment 13 or 14, wherein the panel has first and second faces and wherein the first face of the two flanking segment are attached to the first face of said central segment.
16. The unit of embodiment 14 or 15, wherein the elongated members are associated with the same face of the panel.
17. The unit of any one of embodiments 13-16, wherein
the panel has first and second faces,
the first face of each of the flanking segments is associated with the first face of the central segment, and wherein
opposite edges of the panel, at the end of said flanking segments, are proximal to one another.
18. The unit of embodiment 13 or 14, wherein
one or more portions of a face of one flanking segment are attached to corresponding one or more portions on the same face of said central segment, and
one or more portions of said second flanking segment are attached to corresponding one or more portions of the opposite face of said central segment. 19. The unit of embodiment 18, wherein
one of the parallel elongated members is associated with one face of the panel, and
the other of the parallel elongated members is associated with the opposite face of the panel.
20. The unit of any one of the embodiments 1-19, wherein said planar element comprises one or more voids.

21. The unit of any one of embodiments 11-20, comprising one or more integral second core-envelope elements oriented normal to said parallel elongated core-envelope elements.
22. The unit of any one of embodiment 1-21, comprising a high density cardboard panel sandwiched between two layers of low-density cardboard.
23. A structural unit having a planar element that comprises a high density cardboard layer sandwiched between two layers of low-density cardboard.
24. The unit of embodiment 23, wherein the two layers of low density cardboard that sandwich a high layer are formed from a single folded cardboard panel.
25. The unit of embodiment 23 or 24, wherein each layer is adhered to a neighboring layer.
26. The unit of any one of embodiments 23-25, being shaped according to structural requirements by cut-outs in the planar element.
27. The unit of any one of embodiments 1-26, being part of a wheeled device.
28. The unit of embodiment 27, wherein the wheeled device is a bicycle or tricycle.
29. The unit of embodiment 27 or 28, having the following characteristics:
being a fork of a bicycle or tricycle and configured for coupling with (i) a front wheel and (ii) one or more other parts of the bicycle or tricycle.
30. The unit of embodiment 29, comprising a core-envelope element integral with said planar element and configured as a handlebar of the bicycle or tricycle.
31. The unit of any one of embodiments 1-30, comprising at least one hollow elongated member.
32. The unit of embodiment 31, wherein at least one of the hollow elongated members is cylindrical and accommodates an axle.
33. A land vehicle comprising a structural unit as defined in any one of embodiments 1-32.
34. The land vehicle of embodiment 33, being a bicycle or tricycle.
35. The land vehicle of embodiment 34, being a balance bike.
36. The land vehicle of embodiment 34 or 35, comprising a front-wheel steering unit having the characteristics of a unit of any one of embodiments 1-32.
37. A bicycle comprising a body extending between a front end and a rear end, a fork pivotally coupled to the body, a front wheel fitted to said fork, and a rear wheel fitted at the rear of said body, the body and the fork assembly comprising each an element having the characteristics of the unit of any one of embodiments 1-32.
38. The bicycle of embodiment 37, wherein
the body comprises a planar body element embodying the characteristics of the unit of any one of embodiments 23-25; and
the fork assembly comprises an element embodying the characteristics of the unit of any one of embodiments 1-22.
39. A bicycle comprising:
a body extending between a front end and a rear end, a fork pivotally coupled to the body, a front wheel fitted to said fork and a rear wheel fitted at the rear of said body.
the body and the fork assembly comprising each an element having the characteristics of the unit of any one of embodiments 1-32.
40. The bicycle of embodiment 39, wherein
the body comprises a planar body element embodying the characteristics of the unit of any one of embodiments 23-25; and
the fork assembly comprising an element embodying the characteristics of the unit of any one of embodiments 1-22.
41. A bicycle, comprising:
a body that comprises two planar body elements, each defining a vertical plane and are, typically, mirror images of one another and having both a front end and a rear end, the two body elements being attached to one another at their front end portion to define a front body block and diverge from one another towards the rear end to thereby define a body space between them; each of said elements embodying the characteristics of the unit of any one of embodiments 23-25;
a rear wheel fitted within the body space and being rotationally coupled to the two panels at a rear end thereof by a horizontal axle that is received within co-axial bushings fitted in said panels;
a steering assembly comprising a planar fork member embodying the characteristics of the unit of any one of embodiments 1-22 and formed by cut-outs to define
a fork portion with two stems defining a between them a stem space, and
a panel opening in a mid-portion of the panel;
a vertical fork pivot-accommodating receptacle formed within said front body block and accommodating a pivot that extends vertically through the panel opening between bushings formed at opposite edges of said opening to hinge said fork to said body; and
a front wheel fitted within the stem space and being rotationally coupled to the two stems by a horizontal axle that is received within co-axial bushings fitted in said stems.
42. The bicycle of embodiment 41, wherein one or more of the bushings, typically all of them, are made of plastic.
43. The bicycle of embodiment 42, being a training bike.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a schematic representation of the manner of production of a cardboard-based unit according to an embodiment of the disclosure.

FIGS. 1B and 1C show, respectively, a schematic perspective view and a view from above, of the so formed unit.

FIG. 2A is a schematic representation of the manner of production of a cardboard-based unit according to another embodiment of the disclosure.

FIGS. 2B and 2C show, respectively, a schematic perspective view and a view from above, of the so formed unit.

FIG. 3A is a schematic illustration of the manner of production of a cardboard-based unit according to a further embodiment of the disclosure.

FIG. 3B shows a cardboard-based unit according to that embodiment.

FIG. 3C shows a side vies of the unit of FIG. 3B.

DETAILED DESCRIPTION OF EMBODIMENTS

Figure 4:
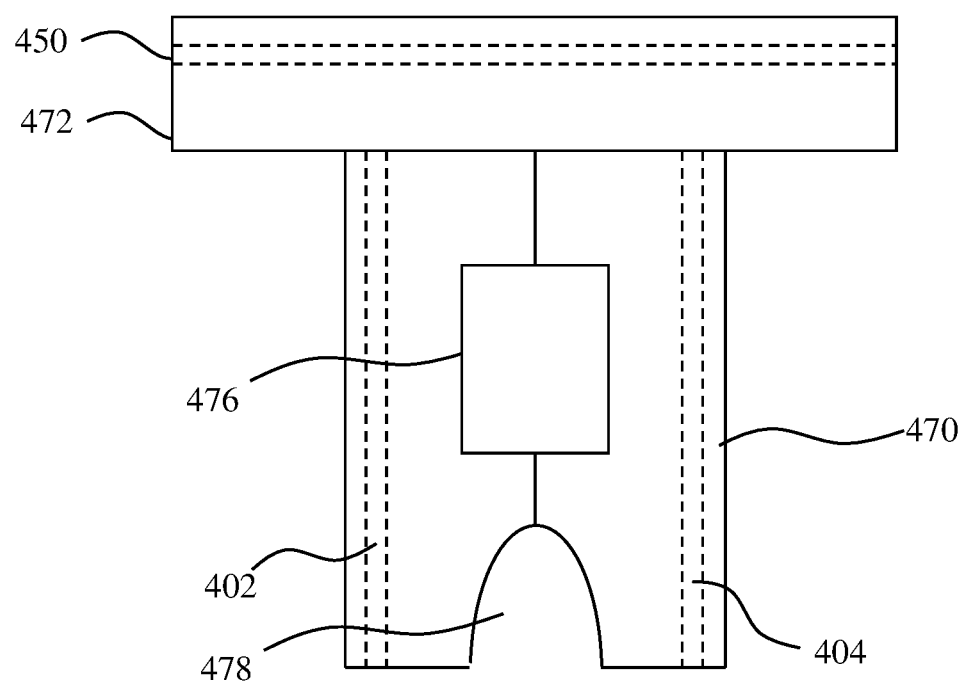
FIG. 4 shows a front view of a cardboard-based unit according to another embodiment of the disclosure, which similar on overall shape to that of FIG. 3B, with some functional cut-outs.

The disclosure will now be illustrated below with reference to a number of embodiments, schematically represented in the attached drawings. In the description below, FIG. 1 (namely 1A, 1B and 1C) relate to one embodiment, and each of FIGS. 2, 3, 4 and 5 relate to different embodiments. The different components of these embodiments are each indicated by a three digit numeral, the first digit given according to the figure in which they appear (for example, in FIG. 1 the numerals all begin with "1"; whereas in FIG. 2 with the numeral "2"); while the last two digits are specific for the component. In different figures like components are indicated by a three digit numeral having the same last two digits. By way of example, component 102 in FIGS. 1A and 1B is like (having similar function to) component 202 in FIGS. 2A and 2B. Such like components may not be described each time and the reader is directed to look into the description of the corresponding component in other embodiments.

It should be noted that for the purpose of illustration, some dimensions were drawn out of proportion. By way of example, in some figures a cardboard panel is shown, from which a cardboard-based unit is produced. The panel is shown to have a thickness that is out of proportion of the thickness of at least some of the actual panel to be used in accordance with the disclosure. The out of proportion thickness is for illustration purposes only as had it been drawn to proportion, it may have been more difficult to view it in the drawings.

Reference is first being made to FIG. 1A showing a cardboard panel 100 associated with two elongated members 102, 104 positioned on corresponding parallel lines 106, 108, on a first face 140 of panel 100, equidistant from respective opposite edges 110, 112 (lines 106, 108 are imaginary lines that do not exist in the actual panel). Elongated members 102, 104, that are parallel to one another, separate between respective flanking portions 114, 116 and a central portion 118 of the panel.

In order to form a cardboard-based unit according to an embodiment of the disclosure, panel 100 is folded along lines 106, 108, as represented by arrows 106A, 108A such that portions thereof 120, 122 along and flanking lines 106, 108 wrap around and envelope tightly the elongated members 102, 104, such that in the eventually formed unit, as seen in FIGS. 1B and 1C, portions 114, 116 are tightly associated at their first face, e.g. through use of adhesive, with the first face of portion 118.

In the formed unit shown in FIGS. 1B and 1C, two elements can be identified: two parallel, elongated, core-envelope elements 130, 132 that define edges of the unit with a planar bi-layer element 134 extending therebetween. Also, in this embodiment, panel edges 110, 112 are brought into close proximity with one another. In this way, the formed cardboard panel defines a closed loop configuration about the two elongated members.

The elongated members 102, 104 in this embodiment and those described below have a circular cross-section. In some embodiments they may have other round cross-sections, e.g. elliptical, oval.

The elongated, core-envelope elements 130, 132, as also the other elongated, core-envelope elements in the embodiments described below, have rounded edges which are a result of the forming process. However, through the use of appropriate dies or molds, the edges may be press-formed to have other forms, e.g. rectangular. The cardboard panel may, by one embodiment, be a corrugated or honeycomb cardboard panel. However, the disclosure is not limited to cardboard panels of this type.

Reference is now being made to FIGS. 2A-2C which illustrates a unit according to another embodiment (FIGS. 2B and 2C) and the manner of forming such a unit (FIG. 2A). As distinct from the embodiments of FIGS. 1A-1C, according to those of FIGS. 2A-2C the cardboard panel is formed into a shape resembling an "S", rather than a closed loop.

In describing the embodiments of FIGS. 2A-2C, in order to facilitate description, reference will be made to two opposite faces of the panel designated as a first face 240 and a second opposite face 242.

As can be seen in FIG. 2A, elongated member 202 is associated with first face 240 (positioned along line 206 parallel to edge 210) and elongated member 204 (parallel to elongated member 202) is associated with the second face 242 (positioned along line 208 parallel to edge 212).

As illustrated in FIG. 2A, lines 206, 208 define three portions of substantially the same widths, including two flanking portions 214, 216, and a central portion 218. The panel 200 is formed by folding it along line 206 in the direction represented by arrow 206A and in the opposite direction along line 208 in the direction represented by arrow 208A. Eventually the so-formed cardboard-based unit, seen in FIGS. 2B-2C has two parallel, elongated, core-envelope elements 230, 232 at opposite ends of an overall substantially planar 3-layer element 234.

In the two embodiments of FIGS. 1A-2C, as previously described, parallel elongated members 102, 104 and 202, 204 (corresponding to elongated core-envelope elements 130, 132 and 230, 232) extend the entire length of the original cardboard panel and hence along the entire length of the formed cardboard-based unit. However, in some embodiments, such members may extend only the partial length, typically the majority of the length of the panel. According to another embodiment, rather than a single elongated member in said elongated, core-envelope element, two or more elongated members, arranged along the same axis, may be comprised within the elongated elements. In other words, the elongated member, in this case, is defined by a number of individual segments that may all be of the same or a different length. Such segments may be positioned such that an end of one is position adjacent an end of another; or such segments may, at times, be spaced apart from one another. The different segments may be made of the same or a different material. While such segments will typically have the same cross-sectional shapes, they may, at times, have different cross-sectional shapes.

Another cardboard-based unit and the manner in which it is formed are shown in FIGS. 3A-3C, which has a somewhat more complex design than that of the preceding illustrated embodiments.

Turning now to FIG. 3A, a cardboard panel 300 and three elongated members 302, 304, 350 can be seen. Elongated members 302, 304 are situated parallel to one another and to edges 310, 312, along lines 306, 308; and elongated member 350 is positioned parallel to edge 358, namely, oriented normal to elongated members 302, 304. Cardboard panel 300 is cut along lines 306B, 308B which extend parallel to edge 358 from respective edges 310, 312 to respective lines 306, 308.

The flanking portions 314, 316 defined between lines 306, 308 and respective cuts 306B, 308B are folded in the direction of arrows 306A, 308A, in a similar manner to that described with respect to FIG. 1A, to eventually form, in the unit shown in FIG. 3B, a vertical structure 370 with a bi-layer element defined between two parallel, elongated core-envelope elements 330, 332 at the edges thereof. The top portion 354 of the cardboard panel, defined between lines 352 and edge 358, is then folded along line 352 and over elongated member 350 in the direction of arrow 352A to form a transverse elongated, core-envelope element 372. As can best be seen in FIG. 3C, the cardboard panel portion extending down from element 372 is integral with the central portion of the panel in structure 370.

Turning now to FIG. 4, showing a cardboard-based unit according to another embodiment of the disclosure, having the overall shape as that shown in FIGS. 3B and 3C. As can be seen, the unit in FIG. 4 differs from that of FIG. 3B by having two cut-outs voids 476, 478 that may be cut-out after forming the unit of FIG. 3B. The unit may serve as a front element of a tricycle in which cut-out 478 accommodates a front wheel of a tricycle, the wheel received through axle holders embedded in the bottom part of element 470 (not shown in this Fig. but will be illustrated further below); while cut-out 478 is articulated to the rear part of a tricycle via a vertical axle receptacle embedded in element 470 (not shown but will be illustrated in FIGS. 5B and 5C).

Figure 5A:
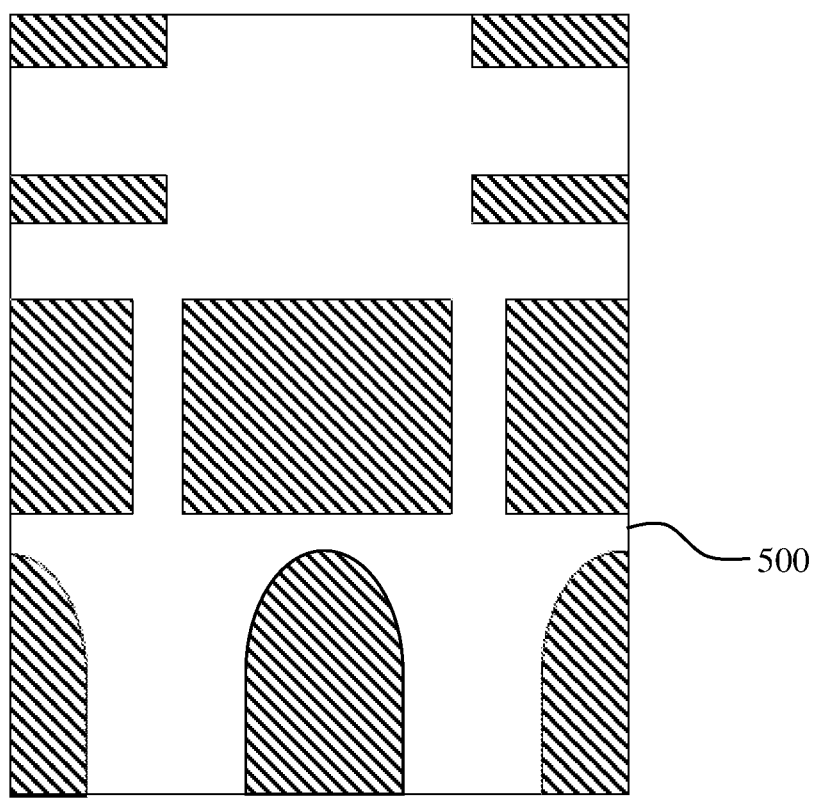
FIG. 5A is a front view of a cardboard panel with marked segments to be cut-out prior to forming of the cardboard-based unit according to another embodiment of the disclosure.
Figure 5B:
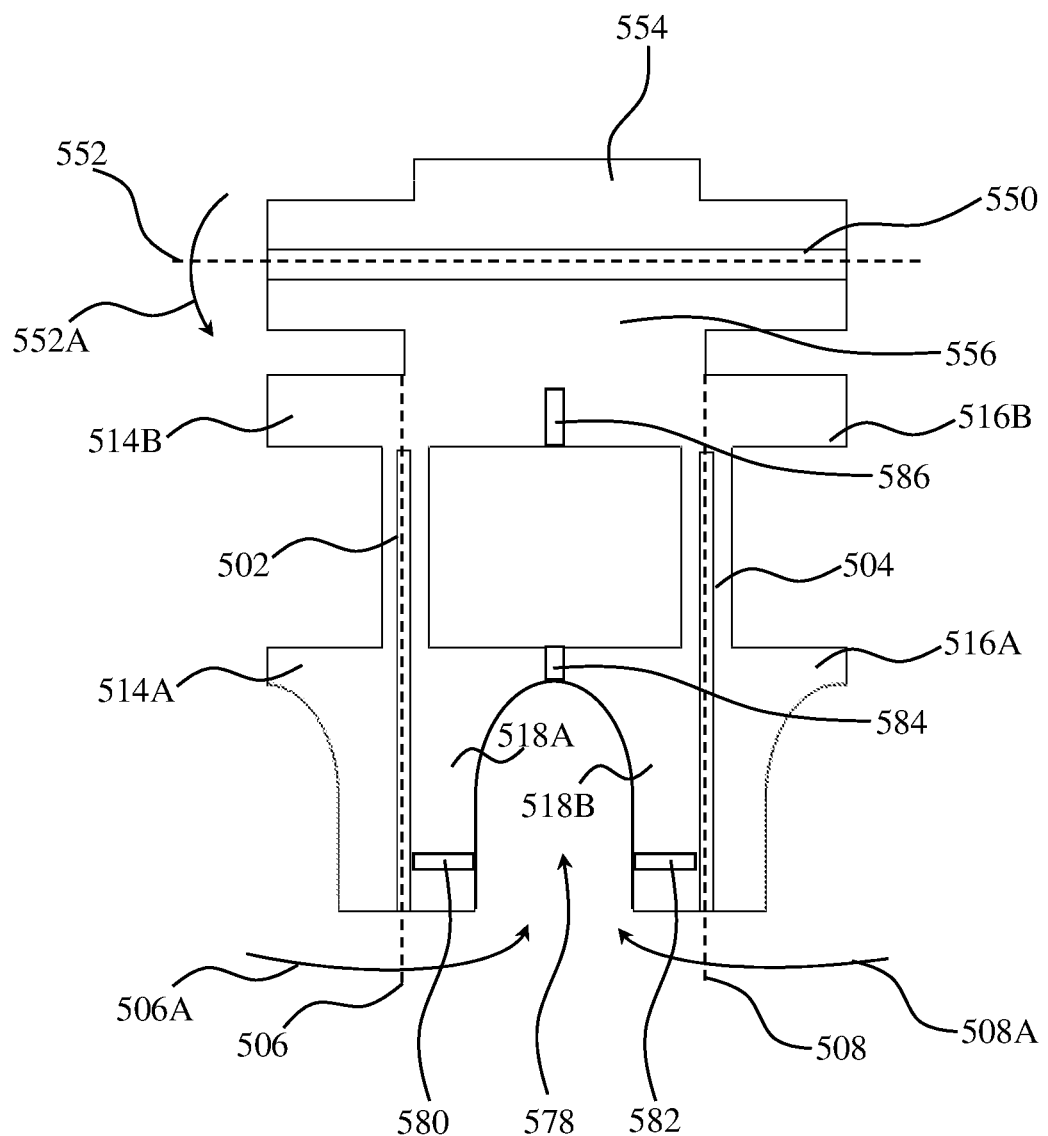
FIG. 5B shows the panel of FIG. 5A with segments cut-out and after positioning of the elongated members.

In some distinction from unit of FIG. 4, the cutouts may also be pre-formed in the panel. This is illustrated in FIG. 5. The cardboard panel 500 seen in FIG. 5A has an overall rectangular shape, but several pieces thereof, drawn as shadows, are cut out to yield the pre-formed panel shown in FIG. 5B.

Figure 5C:
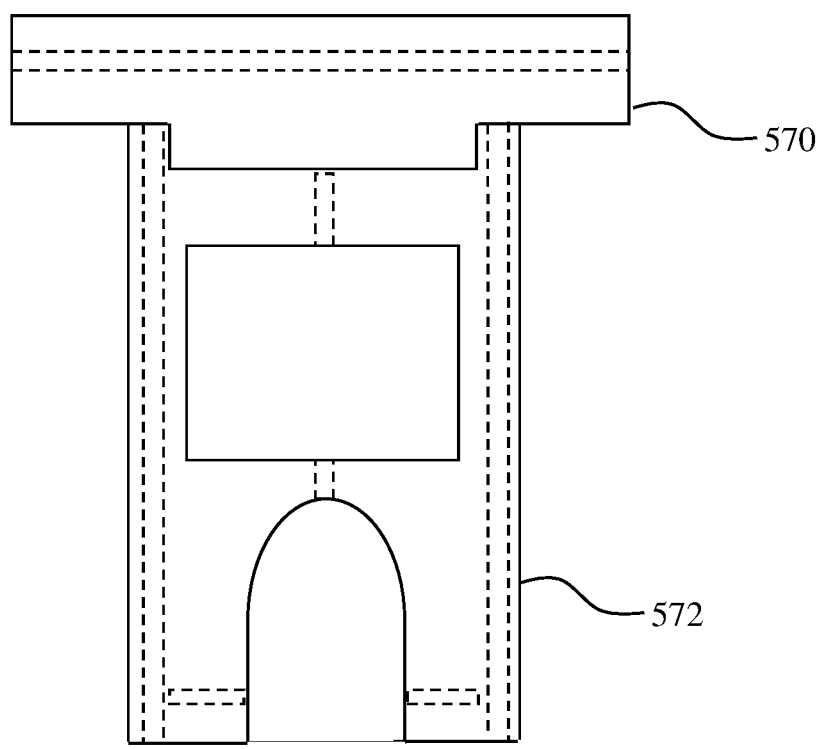
FIG. 5C shows a front view of the cardboard-based unit formed from the panel of FIG. 5B.

Similar as in the case of FIG. 3A, elongated members 502, 504 are positioned along parallel, vertical lines 506, 508 and another elongated member 550 is positioned along line 552 normal to lines 506, 508. Short axle receptacles 580, 582 are placed close to the bottom end of portions 518A, 518B, defined at the two sides of the cut-out 578, which are typically hollow plastic tube segments for receiving respective ends of the axles of the front wheel of a tricycle. Also placed at the cardboard's first face are two vertical segments 584, 586, which may be also hollow plastic tubes, and serve for articulation to the main body of a tricycle. The pre-formed panel is then folded about the elongated member in the direction represented by arrows 506A, 508A and 552A and then, after adhering opposite cardboard faces to one another, the cardboard-based unit shown in FIG. 5C is formed.

Figure 6A:
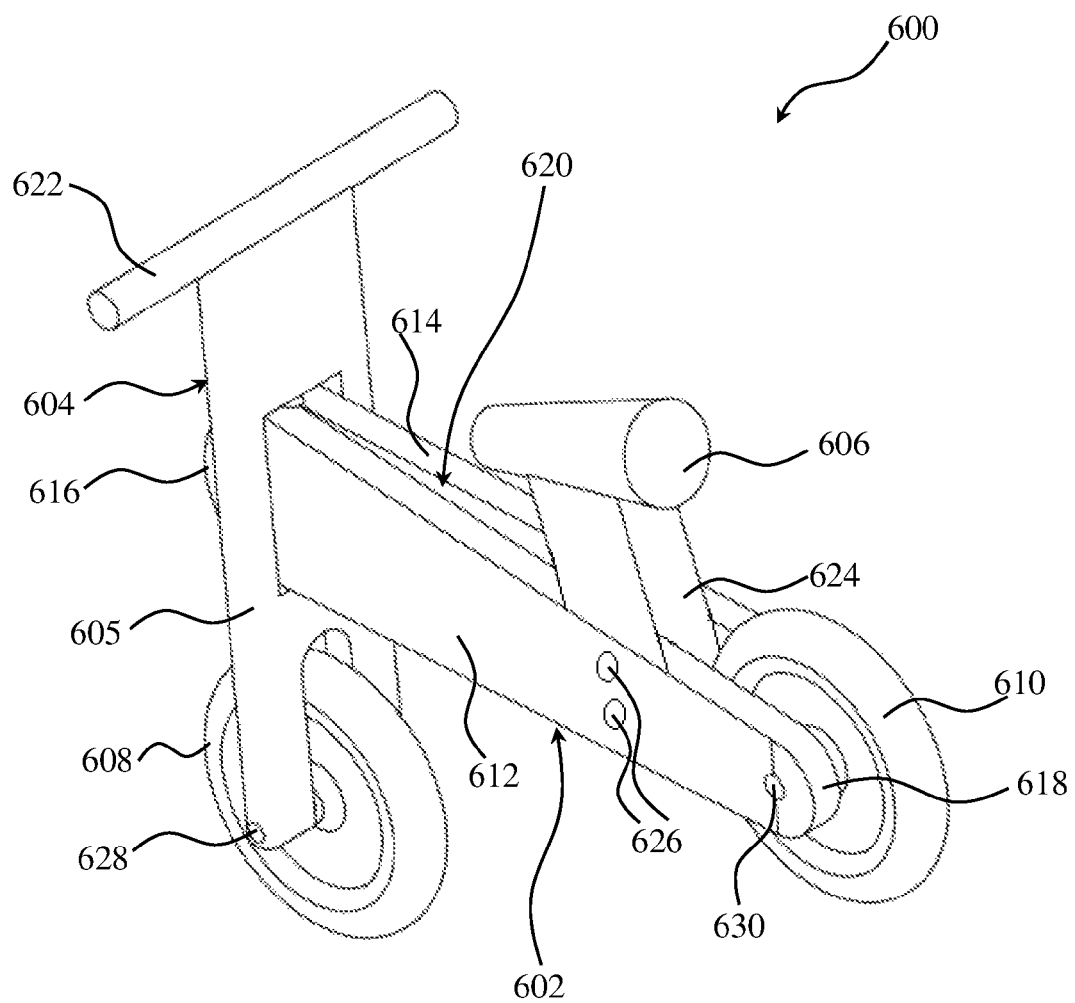
FIGS. 6A-6B are schematic representations showing a perspective view and front view, respectively, of a balance bike according to an embodiment of the invention.
Figure 6B:
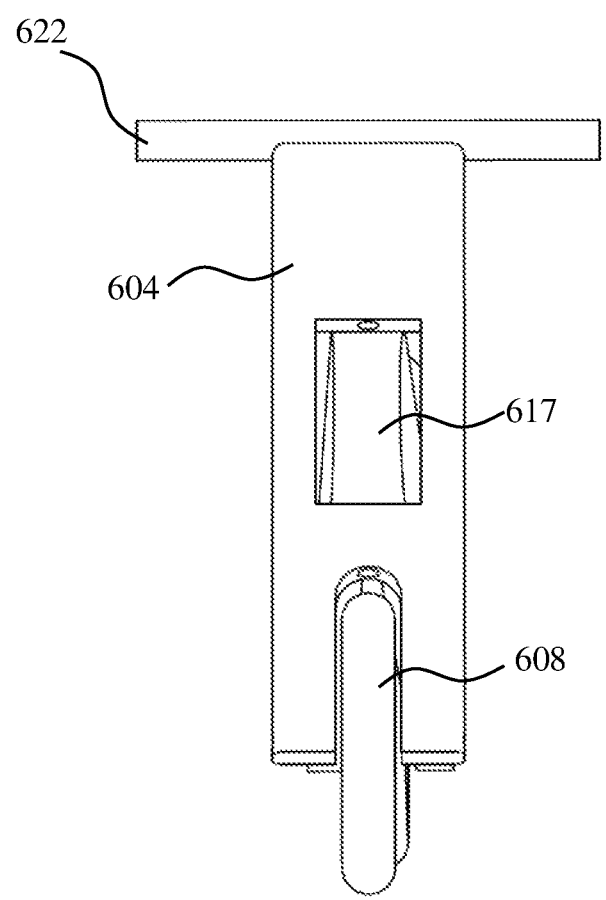

Shown in FIGS. 6A-6B is a balance bike 600 having body 602, fork and handlebar and fork assembly 604, seat 606, and front and rear wheels 608, 610. The primary material out of which the balance bike 600 is cardboard; main exception include the wheels and some elements to be described below that include the axles, the elongated members, the bushings and the pins.

As can further be seen in FIGS. 6A-6B, body 602 is composed of two planar body elements 612, 614 that define each a vertical plane, and are essentially mirror images of one another. Elements 612, 614 are attached to one another at the front end portion 616 to define a front body block 617 and diverge towards the rear end 618 defining between them a body space 620, which widens towards the rear end.

As will further be explained, embedded in front body block 617 is a set of co-axial bushings (not seen in FIGS. 6A-6B but will be described below and illustrated in other Figs.) which accommodate a fork pivot (also to be described below) that provides for rotational engagement between the fork assembly 604 and body 602, permitting a child rider holding handlebar 622 to steer the front wheel 608. Fitted within the body space 620 is a stem 624 of seat 606, which is held in position by pins 626 that cross between the two body elements 612, 614 and through stem 624. Wheels 608, 610 are rotationally coupled to respective fork 605 and rear end 618 of body 602, through respective axles 628, 630.

The manner in which the body, as well as the fork assembly, is constructed and hence also their constituents will now be described with reference to FIGS. 7A-7H and 8A-8H.

FIGS. 7A-7H illustrate the manner of construction of body 602, of which FIGS. 7A-7G illustrate steps for constructing one of body elements 612, 614. At a first step, a cardboard panel 700 having a general rectangular shape is provided and a groove 702 is formed at about the midline 704 (represented by a dotted line) to thereby define two portions (A) of substantially the same dimensions. The cardboard panel may, for example, be corrugated or honey-combed cardboard, e.g. of 10-14 mm, 11-13 mm or at times 12 mm thickness.

Figure 7A:
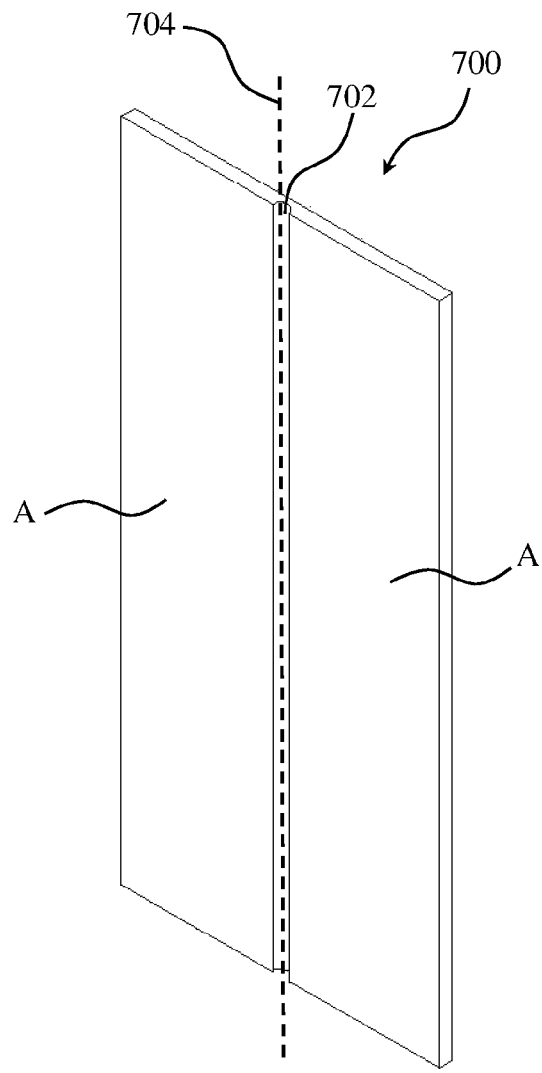
FIGS. 7A-7H are schematic illustrations of steps in the manufacture of the body of a balance bike.
Figure 7B:
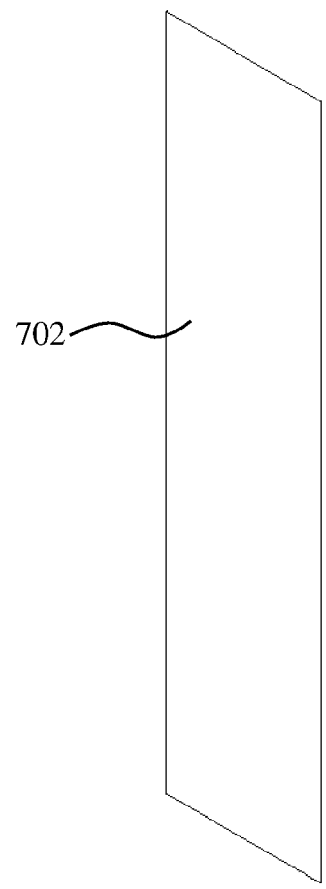
Figure 7C:
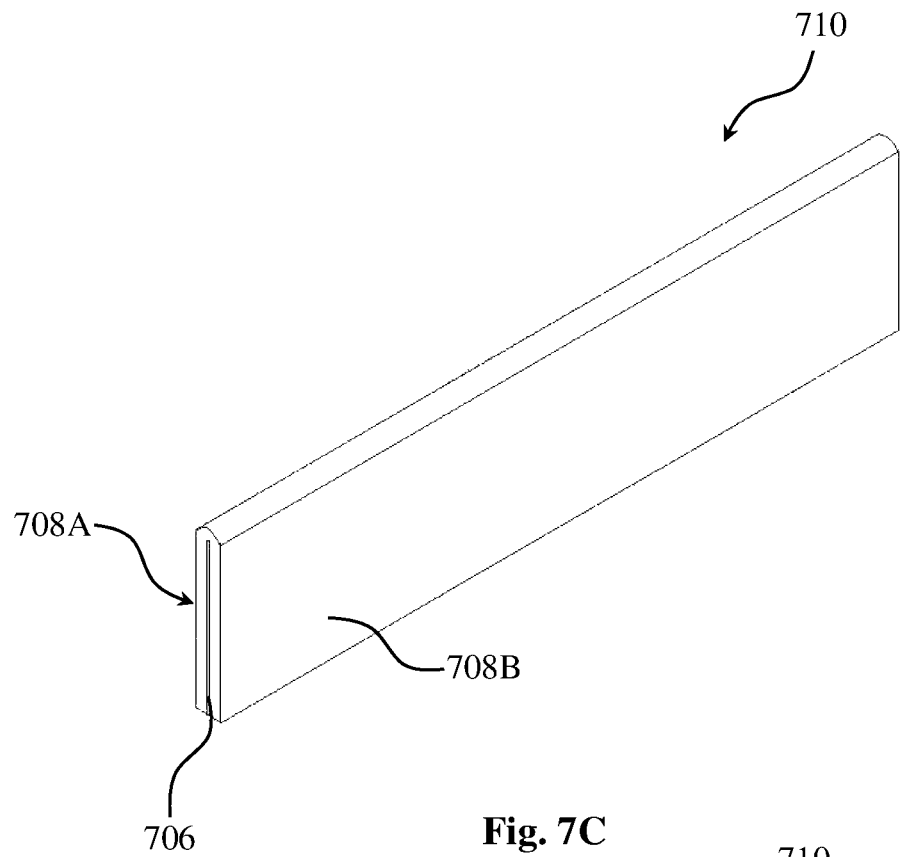

A high density cardboard panel 706, typically a 600 g/m$^2$ cardboard sheet, having the same dimensions as portions A, shown in FIG. 7B, is provided and a thin layer of glue is spread on both of its faces. Panel 706 is then integrated with panel 700, which is folded about the midline 704, to embrace and tightly associate through adherence to panel 706, as seen in FIG. 7C. This thus brings to the formation of the three-layered structure 710 with two external layers 708A, 708B of low density cardboard, e.g. corrugated or honeycombed, and an internal layer of high density cardboard. This three-layered structure is rigid and has load-bearing characteristics of a unit of the second aspect.

Figure 7D:
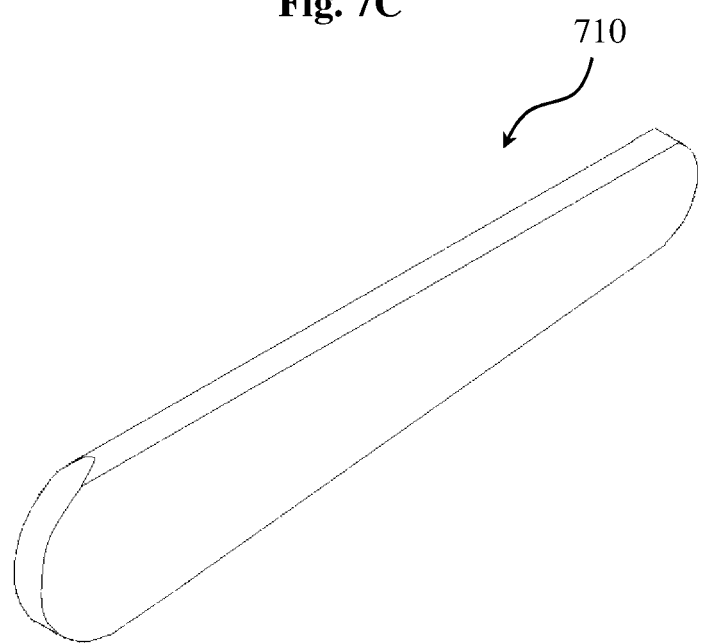
Figure 7E:
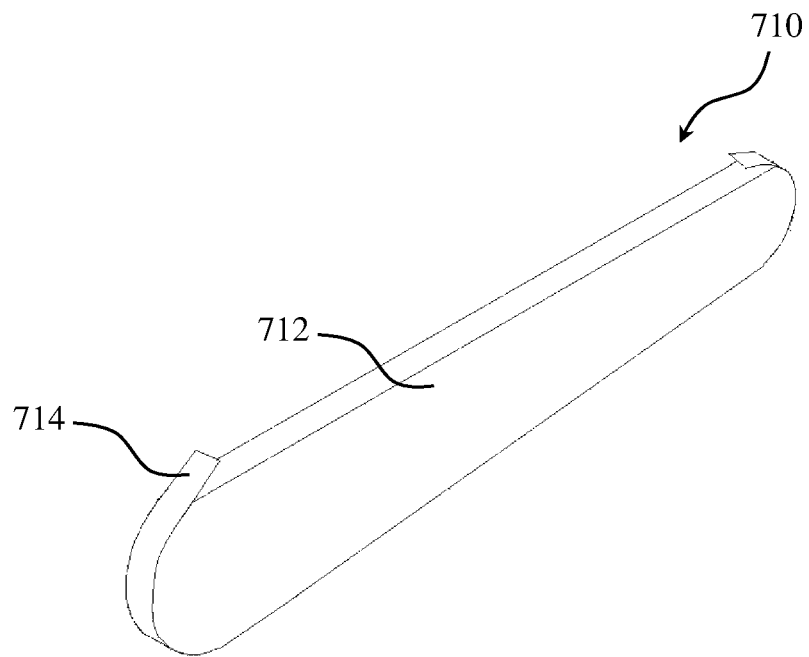

At a next step structure 710 is shaped to the intended body shape to achieve the desired form, as shown in FIG. 7D. Then, as represented in FIG. 7E, the edges of the structure, other than edge 712 which is defined by fold 704, are then layered with a cardboard or paper strip 714.

Figure 7F:
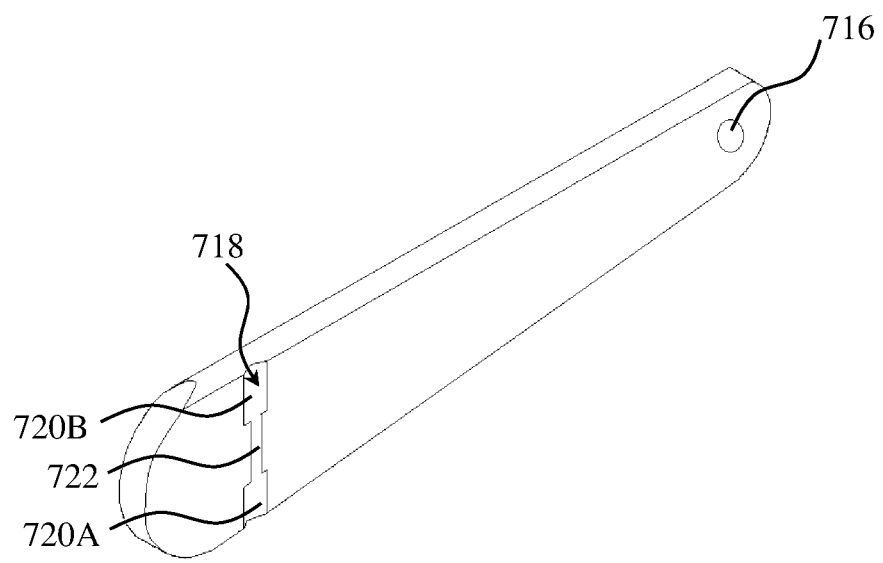
Figure 7G:
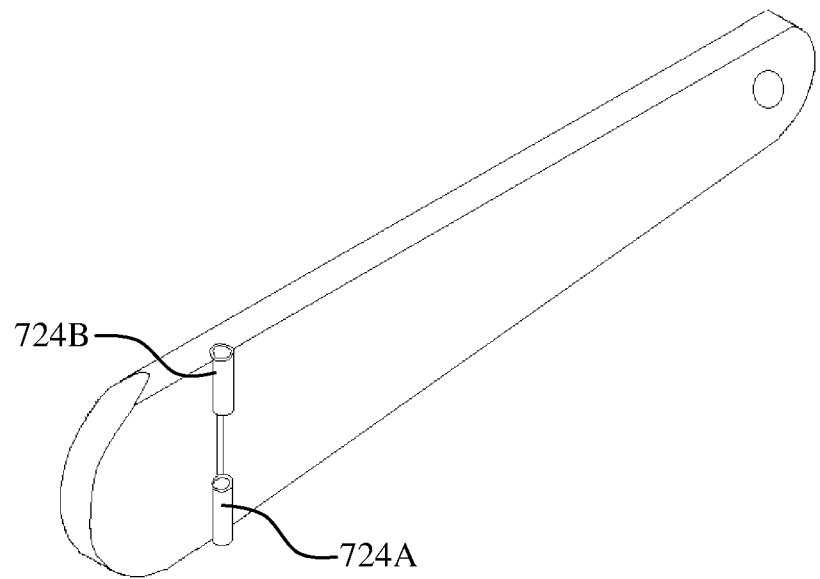

A horizontal bore 716 is then formed at one end that will become the rear end of the body, and a vertical groove 718 having two peripheral wide portions 720A, 720B linked by a narrow portion 722 is formed at the other end, as seen in FIG. 7F. Then, as seen in FIG. 7G, two plastic bushings 724A, 724B are fitted into portions 720A and 720B, respectively.

Figure 7H:
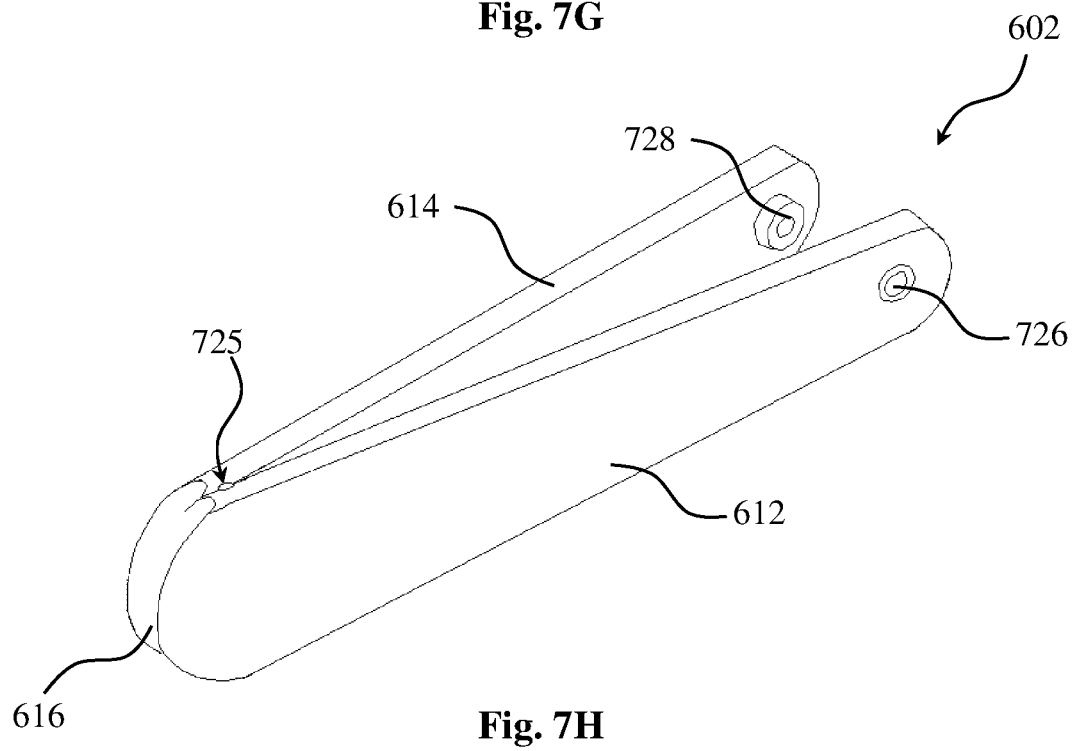

Another of elements 612, 614, which is a mirror image to the first element is then prepared by identical steps and the two are attached tom one another at their front end portion to form body 602 with a front body block 617, with a bore 725 that is defined by bushings 724A and 724B, as seen in FIG. 7H. Two plastic bushings 726, 728 are then fitted into openings 716; these plastic bushings being intended to receive axle 630 of rear wheel 610. At the next step (not shown) two lateral openings are formed in each of elements 612, 614 to accommodate seat holding pins 626, 628.

Reference is now being made to FIGS. 8A-8H illustrating the manner of production and the structure of the fork assembly 604.

These depressions define a central segment 830 and two flanking segments 832, 834. Also formed are two short longitudinal grooves 806, 808 at about midline 810 of the panel; and two lateral grooves at the bottom end of the panel crossing depressions 802, 804, having central segments 812A, 814A and lateral segments 812B, 814B.

Figure 8A:
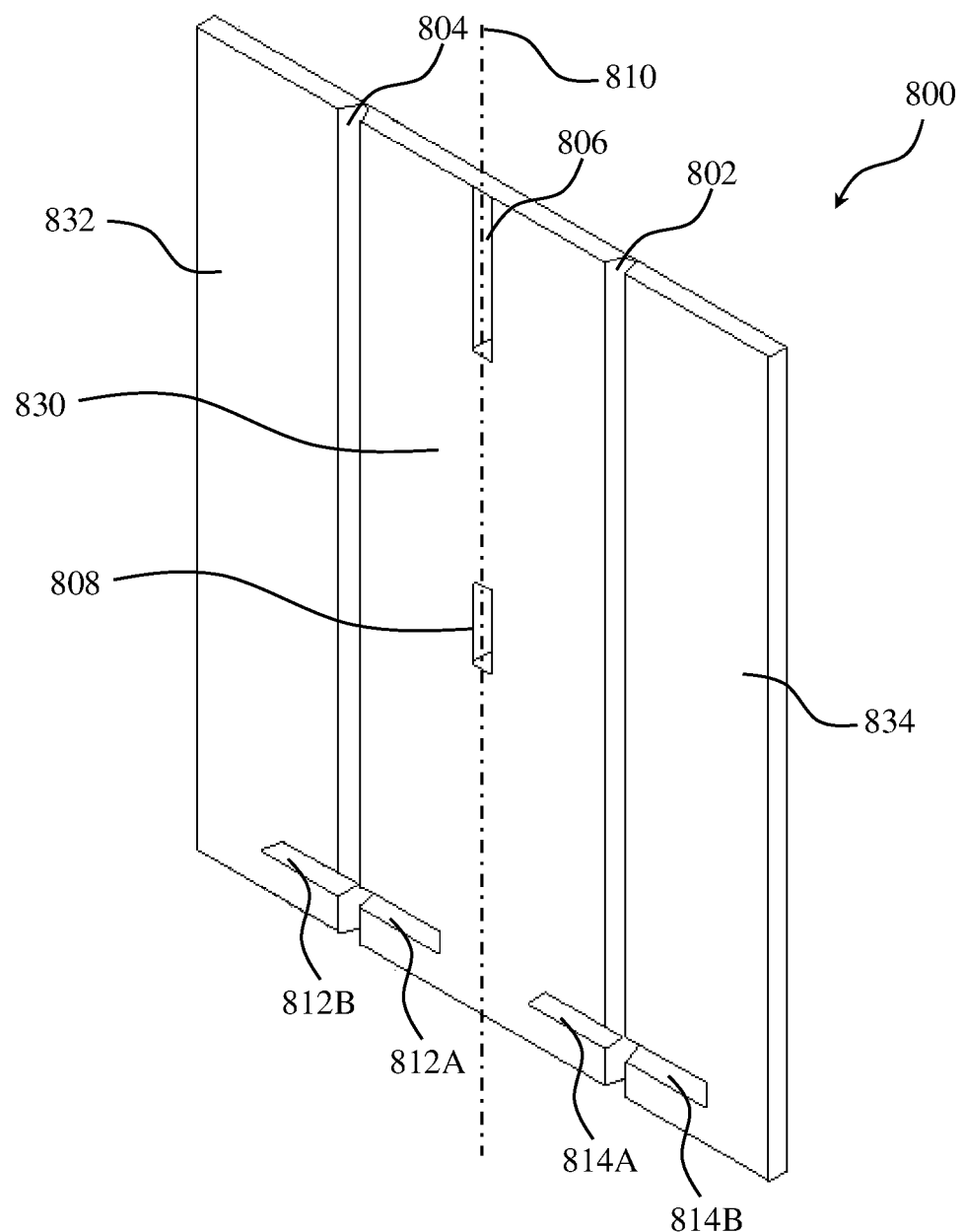
FIGS. 8A-8H are schematic illustrations of steps in the manufacture of the handlebar and fork assembly.
Figure 8B:
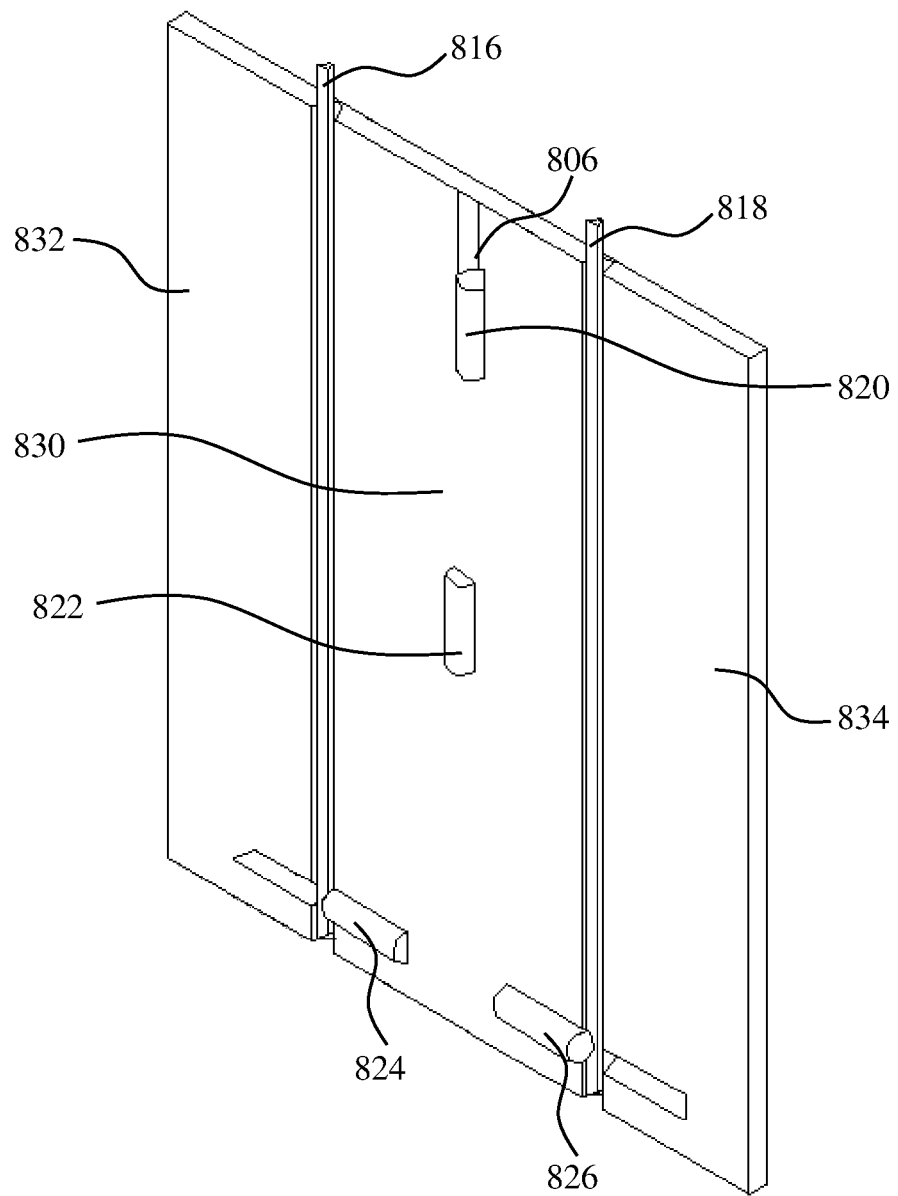

As can be seen in FIG. 8B, longitudinal members that are constituted by rods 816, 818 are fitted into depressions 802 and 804, respectively, the rods spanning the entire length of the grooves and having, respective, top portions 816A and 816B that project out of the top edge of the panel. Rods 816, 818 are typically, but not exclusively, made of wood, cardboard or plastic but may also be made of metal and many other materials. As can also be seen, bushing 820 is fitted at the bottom end of groove 806 and bushing 822 is fitted into groove 808. Furthermore, bushings 824 and 826 are fitted into the two central groove segments 812A and 814A, respectively. Rods 816, 818 and bushings 820, 822, 824 and 826 are typically secured in position through the use of an adhesive.

Figure 8C:
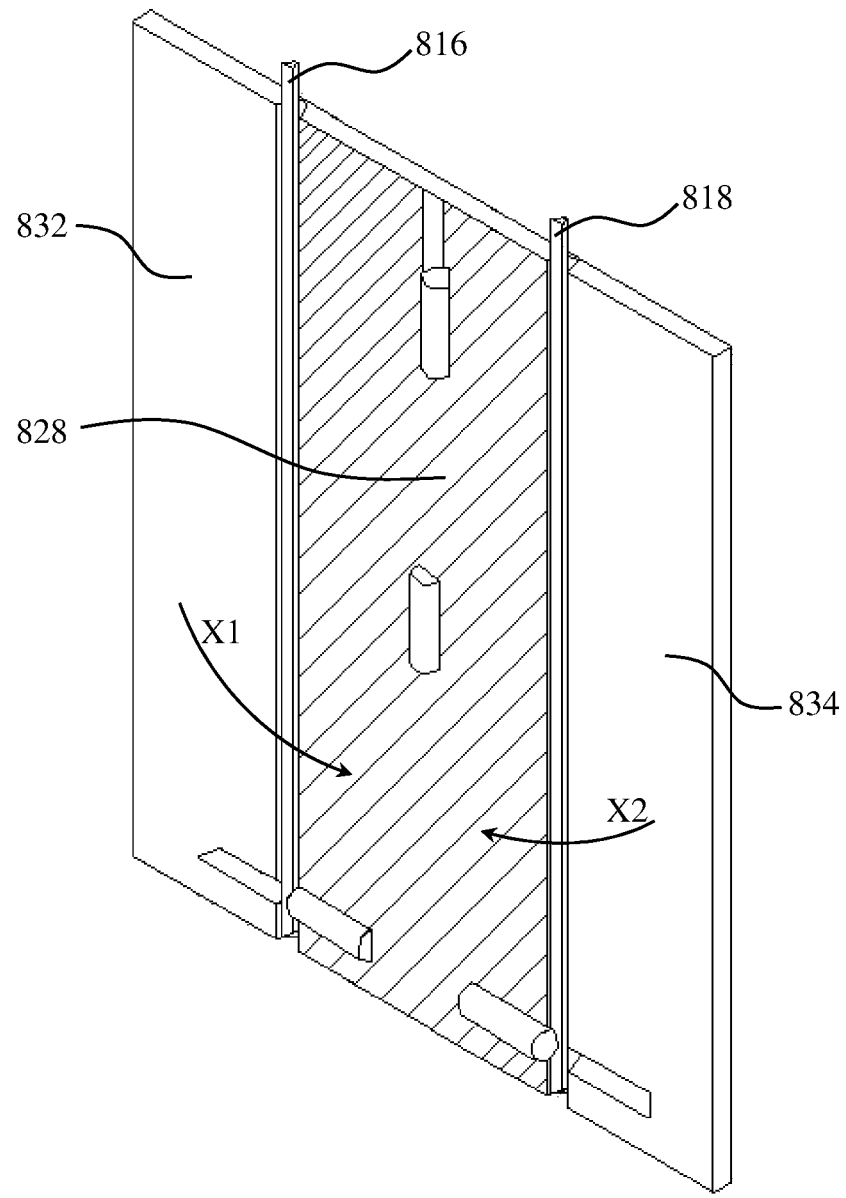

At the next step, seen in FIG. 8C, a high density cardboard panel, which may have similar characteristics to the high density cardboard described above with regard to the body, is then formed to have the shape matching that of the panel's central segment 830. The high density cardboard panel is then attached to the central segment 830, typically through application of an adhesive.

Figure 8D:
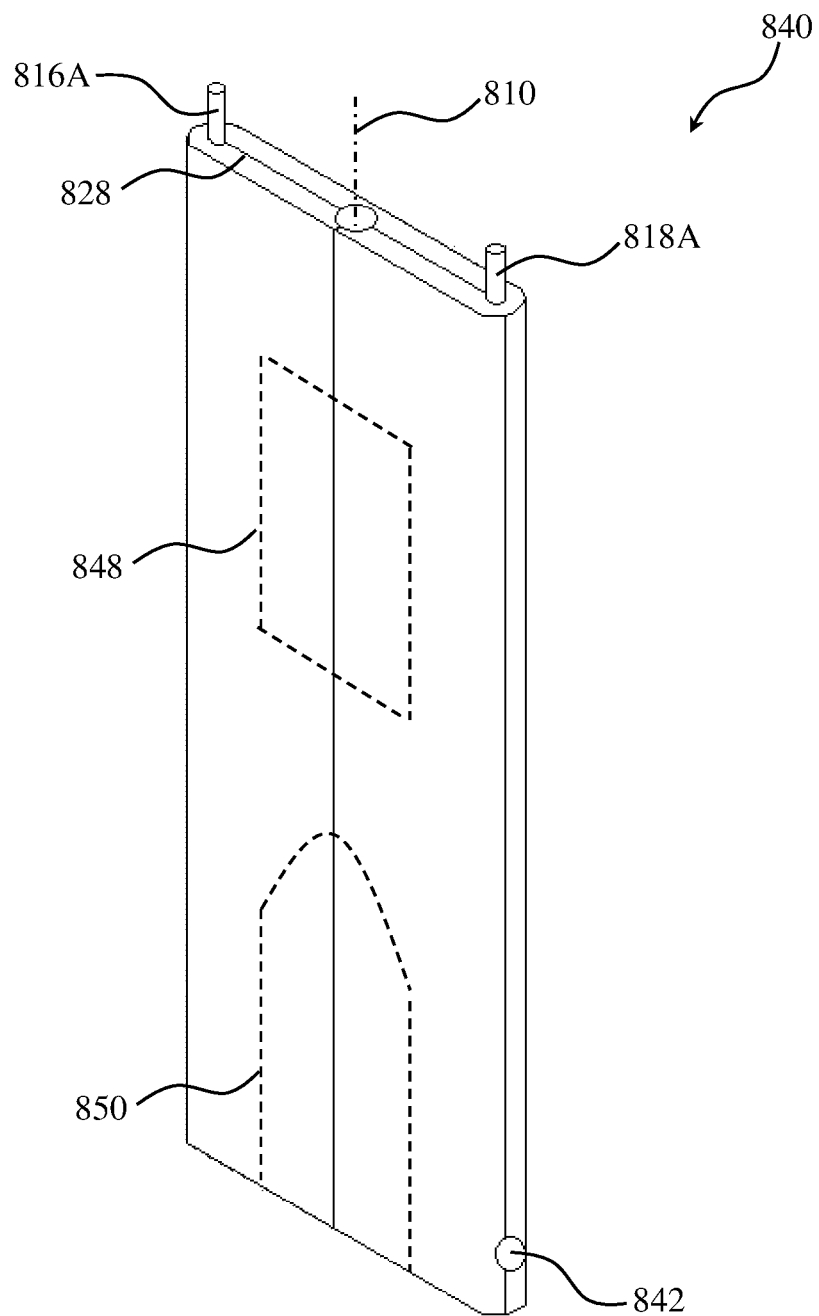

The two lateral segments 832, 834 are then folded in the direction of arrows X1 and X2 to form the structure 840, seen in FIG. 8D, in which the lateral edges of segments 832, 834 are associated with one another at the midline 810 to thereby define a three-layered structure with external low density cardboard layers. As can also be seen, after such folding, groove segments 812A, 813B jointly define a bore 842; a mirror-image opening, of course, also exists at the other end (not seen in this Figure).

Figure 8E:
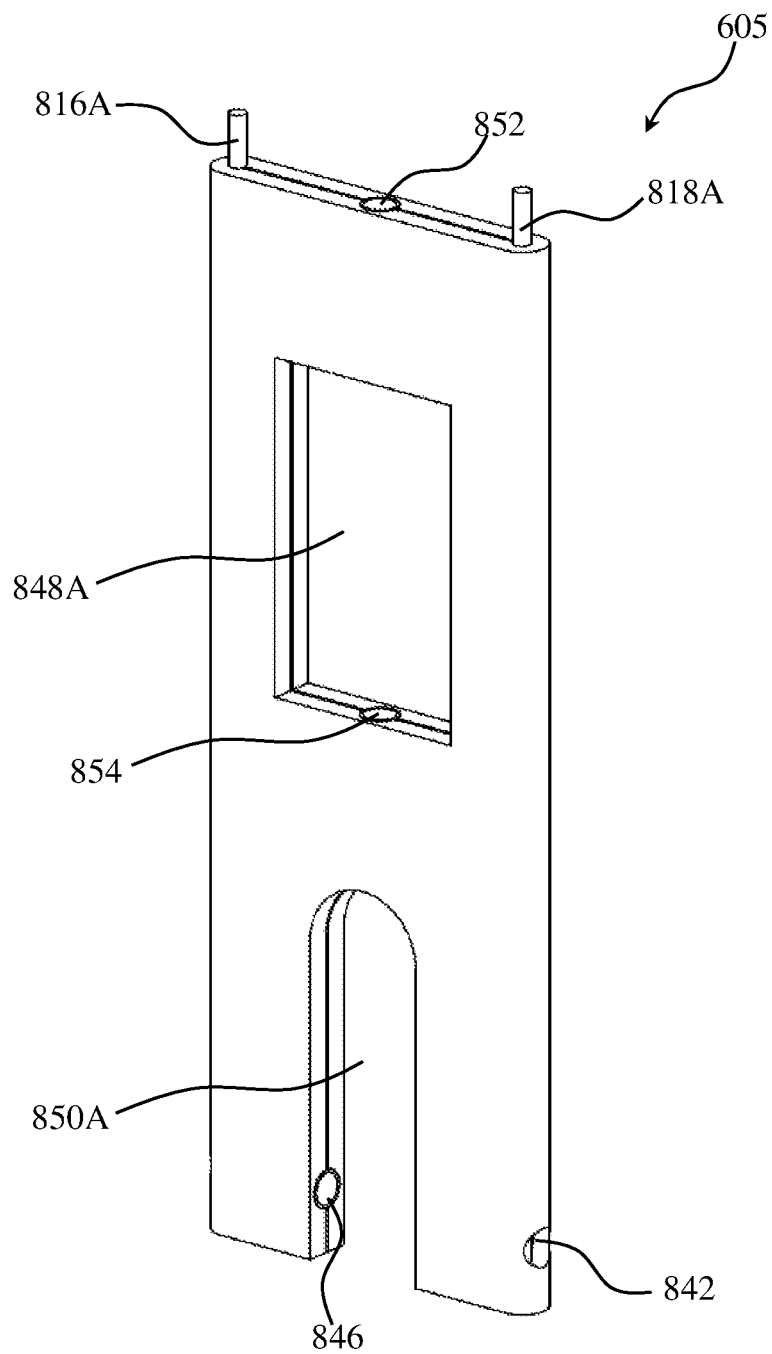
Figure 8F:
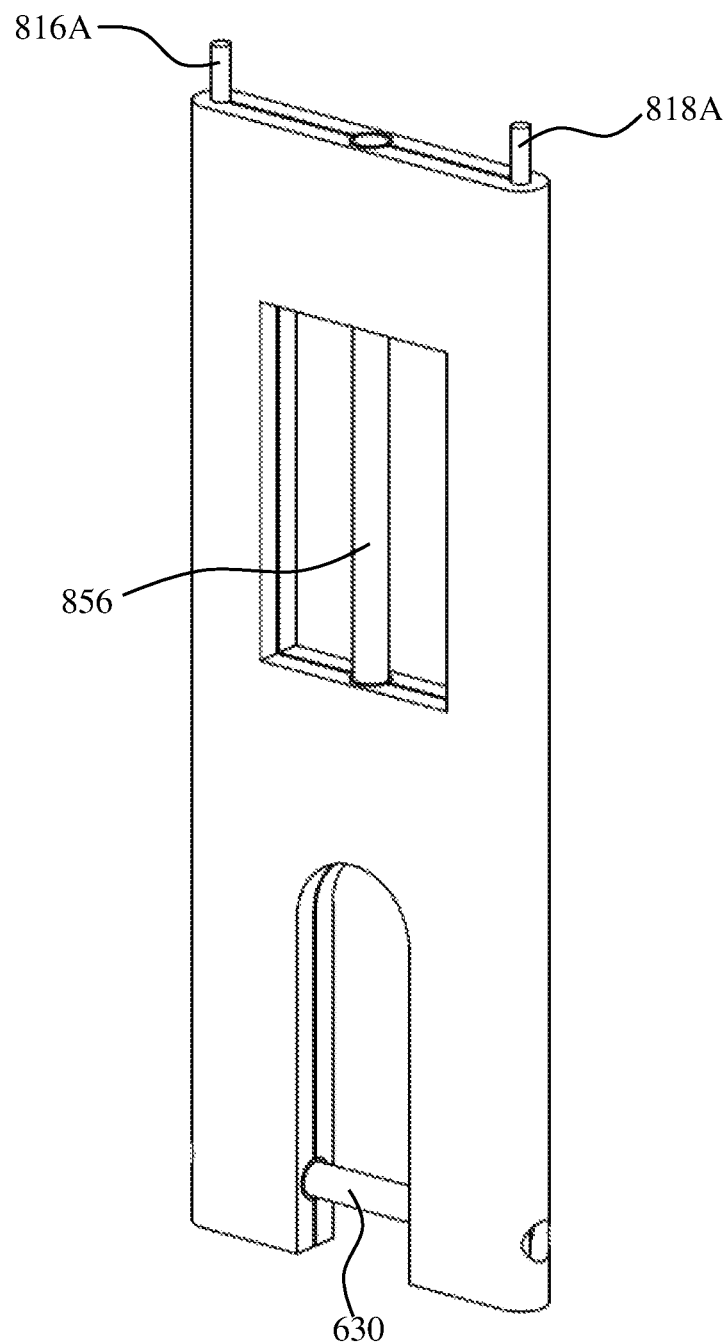

At the next step, rectangular section 848 is cut out from a mid-portion of structure 840 to define an opening 848A and an elongated section 850 with a curved upper end is cut from a bottom portion of structure 840 to define a wheel space 850A, to thereby form the fork unit 605, seen in FIG. 8E.

Visible in FIG. 8E is also bore 846, defined by bushing 826 which is revealed by the cut out of portion 848 and is coaxial with bore 842. Cut out of portion 850 reveals bore 854 defined by bushing 822 which is coaxial with bore 852 defined by groove 806 (which accommodates at its bottom portion bushing 820). Bushings 824 and 826 within bores 842 and 846, respectively, are intended to accommodate pivot 630. Bushings 820 and 822 within respective bores 852 and 854 are intended to accommodate axle 856, as seen in FIG. 8, to thereby couple the body and the fork in a pivotal manner to enable for steering, as described above.

Figure 8G:
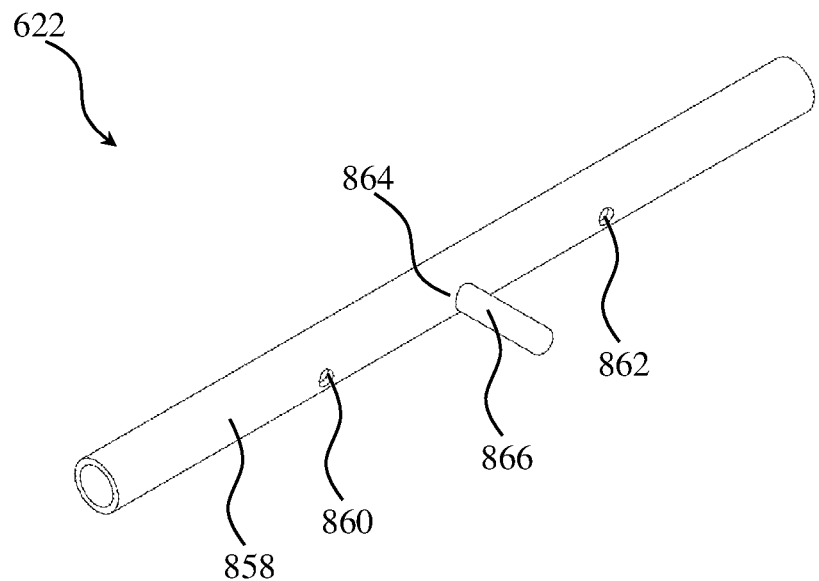
Figure 8H:
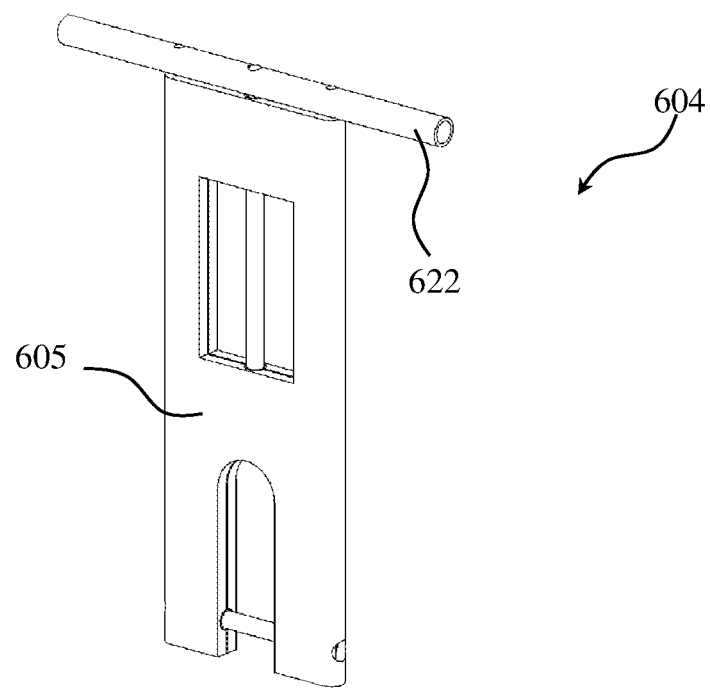

Handlebar 622 is seen in FIG. 8G and includes a cardboard cylinder 858 formed with three bores 860, 862, 864, the latter accommodating pin 866. The bore and the pin are positioned and dimensioned such that bores 860 and 862 can accommodate projections 816A and 818A of rods 816 and 818, respectively, while the pin fits into bore 852. The length of pin 866 is such that once inserted into bore 852, it will fit into the space above bushing 820. By combining the handlebar with the fork, assembly 604 is formed, seen in FIG. 8H.

By inserting body block 617 into opening 848A and then inserting pivot 630 through bore 852 to pass through the bore 725 in body block 617, the body 602 becomes pivotally coupled to assembly 604. The front wheel 608 may then be fitted into the wheel space 850A and rotationally coupled to the fork through axle 630.

The invention claimed is:

1. A bicycle comprising:
a front-wheel steering unit that includes:
a substantially planar element that comprises two or more layers of low density cardboard that are adhered one to the other and being constituted by a formed low density cardboard panel,
two parallel integral core-envelope elements that comprises enveloping portions of the panel that are wrapped about two or more elongated members such that the panel comes into tight association with said members, each core-envelope element defining an edge of the substantially planar element, and
at least one pair of co-axial bushings for accommodating an axle.

2. The bicycle of claim 1, having a body, comprising one or more planar body elements, each of which comprises a high density cardboard layer sandwiched between two layers of low-density cardboard.

3. The bicycle of claim 1, wherein said elongated members have a circular cross-section.

4. The bicycle of claim 1, wherein said elongated members are made of wood, cardboard or plastic.

5. The bicycle of claim 1, wherein the low-density cardboard is corrugated cardboard or honeycomb cardboard.

6. The bicycle of claim 1, wherein the front-wheel steering unit includes one or more integral second core-envelope elements oriented normal to said parallel elongated core-envelope elements.

7. The bicycle of claim 1, wherein two flanking segments of the panel are folded over the elongated members and are associated with a central segment of the panel that is defined between said elongated members.

8. The bicycle of claim 7, wherein
the flanking segments are associated with the same face of the central segment, and wherein
opposite edges of the panel, at the end of said flanking segments, are proximal to one another.

9. The bicycle of claim 1, wherein said planar element comprises one or more voids.

10. The bicycle of claim 1, wherein said planar element comprises a high density cardboard layer sandwiched between two layers of low-density cardboard.

* * * * *